United States Patent [19]
Lundstrom

[11] Patent Number: 5,451,037
[45] Date of Patent: Sep. 19, 1995

[54] MODULAR CARD PROCESSING SYSTEM

[75] Inventor: Robert W. Lundstrom, Plymouth, Minn.

[73] Assignee: DataCard Corporation, Minneapolis, Minn.

[21] Appl. No.: 79,467

[22] Filed: Jun. 18, 1993

Related U.S. Application Data

[62] Division of Ser. No. 745,597, Aug. 15, 1991, Pat. No. 5,266,781.

[51] Int. Cl.6 ............ B41F 13/54; B65H 39/02; B65B 1/00
[52] U.S. Cl. ............ 270/1.1; 270/52.5; 270/58; 101/228; 226/119; 53/284.3; 53/131.5; 53/117
[58] Field of Search ............ 270/1.1, 52.5, 58; 53/201, 284.3, 569, 206, 460, 131.5, 117; 101/219, 228; 400/175, 352, 354, 357; 226/118, 119

[56] References Cited

U.S. PATENT DOCUMENTS

| | | |
|---|---|---|
| 3,820,455 | 6/1974 | Hencley et al. . |
| 3,883,133 | 5/1975 | Rebres . |
| 4,194,685 | 3/1980 | Hill et al. . |
| 4,358,102 | 11/1982 | Hoshizaki et al. . |
| 4,384,196 | 5/1983 | McCumber et al. ............ 235/375 |
| 4,475,829 | 10/1984 | Goff, Jr. et al. . |
| 4,657,164 | 4/1987 | Felix ............ 226/119 X |
| 4,747,706 | 5/1988 | Duea . |
| 4,825,054 | 4/1989 | Rust et al. ............ 235/380 |
| 4,827,425 | 5/1989 | Linden . |
| 4,921,237 | 5/1990 | Nubson et al. . |
| 4,989,852 | 2/1991 | Gunther, Jr. ............ 270/58 X |
| 4,992,950 | 2/1991 | Francisco . |
| 5,012,073 | 4/1991 | Hewitt et al. ............ 235/375 |
| 5,037,216 | 8/1981 | Nubson et al. ............ 400/175 X |
| 5,163,594 | 11/1992 | Meyer ............ 226/119 |
| 5,204,669 | 4/1993 | Dorfe et al. . |

FOREIGN PATENT DOCUMENTS 59-39631 3/1984 Japan .
63-179788 7/1988 Japan .

Primary Examiner—John E. Ryznic
Attorney, Agent, or Firm—Merchant, Gould, Smith, Edell, Welter & Schmidt

[57] ABSTRACT

An inserter module for attaching processed cards to associated card carrier forms having cardholder information printed thereon is provided. The inserter module includes a chassis, printer for printing cardholder information on serially connected card carrier forms, takeup means for maintaining proper takeup of the serially connected carrier forms as they exit the printer, burster for separating the serially connected carrier forms after printing, and inserter for attaching the processed cards to associated printed carrier forms.

12 Claims, 26 Drawing Sheets

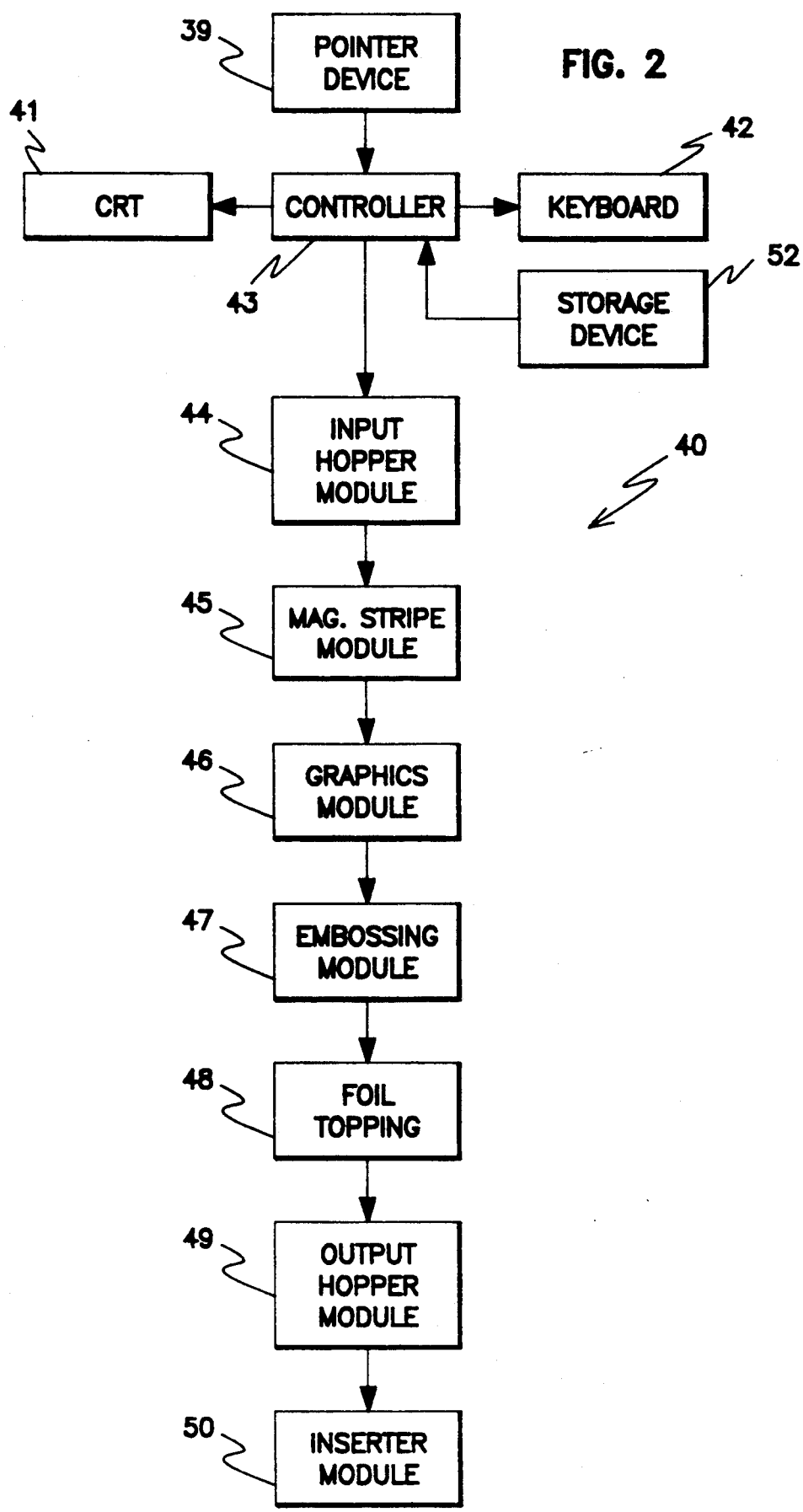

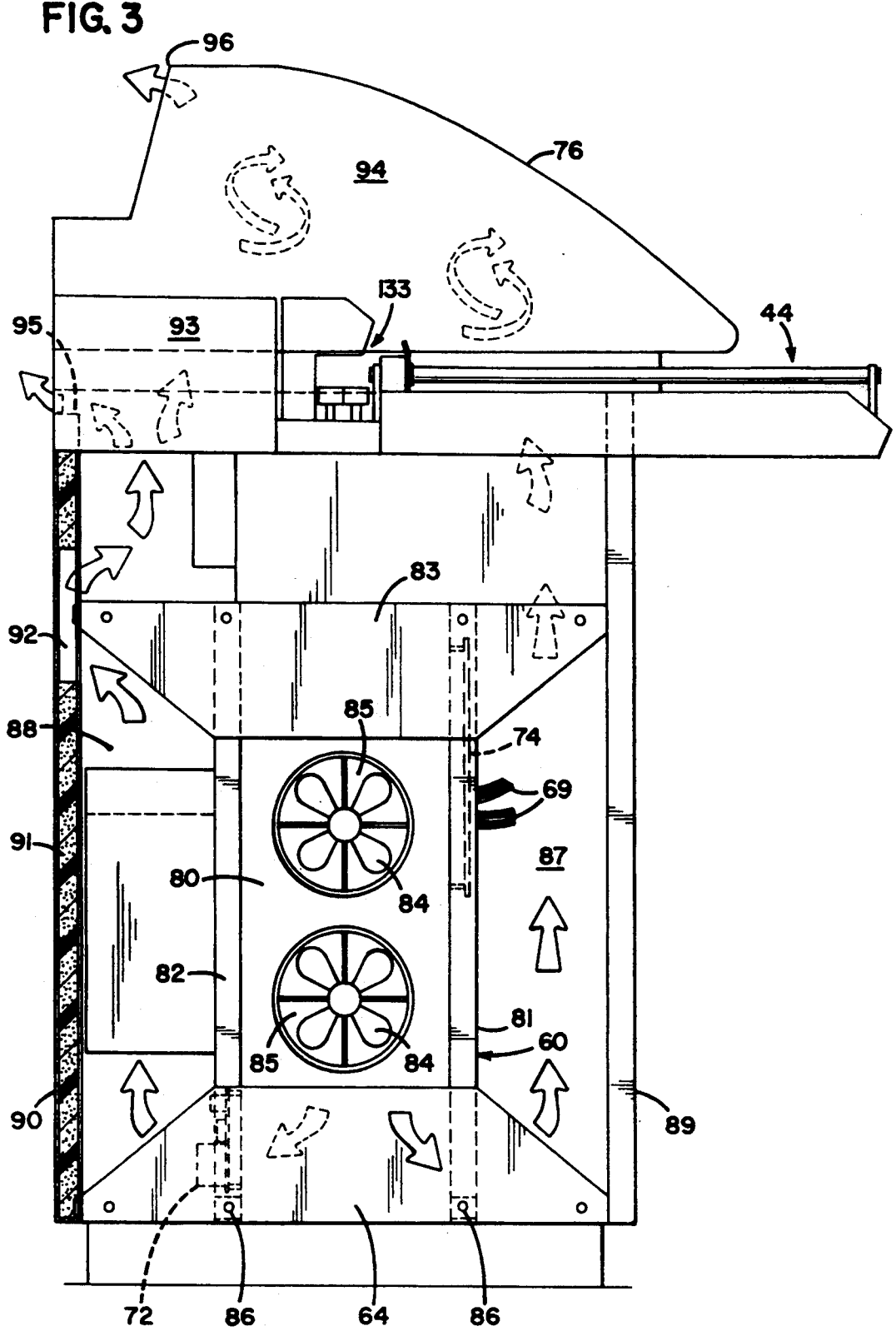

MODULAR CARD PROCESSING SYSTEM

This is a division, of application Ser. No. 07/745,597, filed Aug. 15, 1991, now U.S. Pat. No. 5,266,781.

BACKGROUND OF THE INVENTION

The present invention relates to card processing systems of the type used for producing personalized information bearing cards.

The invention is a modular card processing system which readily permits the assembly and reconfiguration of an application specific card processing system from card processing modules.

Card processing systems are used to produce a number of unique or personalized information bearing cards from unprocessed or partially processed cards. The cards being processed might already have been partially processed so as to have personalized information and/or may already include batch information, security codes, etc. Plastic cards of this type have been widely adopted for use as credit cards, identification cards, drivers' licenses and the like. Such cards may be encoded with various types of information. For example, graphic information, such as photographs and logos and the like as well as alphanumeric information such as account numbers and names, may be encoded onto the cards.

The information placed onto the cards is often referred to as card data. Card data is usually provided to the card processing system as a data structure stored on magnetic tape or other media. Prior art card processing systems, represented by U.S. Pat. No. 4,747,706, teach the inclusion of a host computer in the card processing system to read the data structures from the magnetic tape. The host computer then transfers this data to card processing electronics. The card processing electronics then generate the required card processing signals to instruct the system to perform the various card processing operations.

Existing card processing systems typically are constructed with a fixed size chassis capable of containing a given size and fixed number of card processing modules. There are inherent problems with the construction:

1. The number of card processing functions required by the application varies according to the application. This means that the chassis will, quite often, be too large or too small for a given application.
2. It is difficult to build, test, and stock final assembled card processing systems without incurring a large risk of needing to modify and re-test the final assemblies based on matching the quantity and type of card processing functions required by the application.

A problem with the prior art approach is that the card processing systems are assembled and operated as a unitary structure. Both the hardware and the software are constructed, tested and debugged as a unit. As a consequence, construction and modification of such systems is difficult and expensive.

This invention overcomes these problems by allowing the chassis to always be as large or small as it needs to be. It also allows modules to be built and tested prior to configuration into a system. In fact, modules can be built, tested, packaged and shipped to a job site prior to assembly into a system. Moreover, the present invention provides a modular card processing system which can be reconfigured at the job site so as to add or remove modules as dictated by the changing needs of the application.

A problem common to many prior art input hoppers is that they do not have a break mechanism to prevent movement of the card pusher while cards are being reloaded into the input hopper and/or to allow cards to be loaded without interrupting operations.

Another problem common to prior art systems is that their inserter/burster apparatus are not readily adaptable for use with commercially available printers such that the user can replace and interchange printers as desired depending on the desired results. For example, in some cases it is desirable to have color printing whereas in others black and white dot matrix printing is acceptable.

Yet another problem with many prior art systems is that their inserter/burster apparatus are not able to print on the top of a form. Thus the area which can be printed on the form is limited. Still another problem with many prior art systems is that they do not maintain uniform tension across the width of the paper. Yet another problem is that many do not provide a uniform tension on the form as the form is being printed by the printer and prior to feeding through to the burster mechanism.

Another problem common to prior art systems is the problem of wasted indent tape and/or blurred indenting during indenting of card surfaces. This is do to the fact that during the indenting process, the tape is not always advanced a uniform amount between the indenting of characters. If advanced to little, a previously used portion of the tape is reused causing a variation in the appearance of the character. If advanced too much, tape is wasted.

The present invention solves yet other problems associated with the prior art.

SUMMARY OF THE INVENTION

The present invention provides an inserter module which can be used in a card processing system that has modules that can be assembled in an arbitrary sequence to perform the required card processing function. In the card processing system, the modules have uniform mechanical interface, electrical interface, card process control interface, and are compatible so that they can be assembled together to carry out designated card processing operations under the control of a master controller.

The inserter module of the present invention can attach processed cards to associated card carrier forms having cardholder information printed thereon. The inserter module comprises a chassis, a printer for printing cardholder information on serially connected card carrier forms, takeup means for maintaining proper takeup of the serially connected carrier forms as they exit the printer, a burster for separating the serially connected carrier forms after printing, and a inserter for attaching the processed cards to associated printed carrier forms. The inserter module can include structures for mating with another module or modules in a modular card processing system.

The inserter module provides a paper accumulation function between the print head of the printer and the burster, thereby enabling printing proximate the top of a form. In an embodiment, a paper accumulation function can pivot about two axes so that it can apply tension evenly all along the width of the paper. In yet another embodiment, the paper accumulation function is configured to provide a substantially uniform tension on the paper throughout the range of movement of the paper accumulation function.

These together with other objects and advantages, which will become subsequently apparent, reside in the details of construction and operation as more fully hereinafter described and claimed.

BRIEF DESCRIPTION OF THE DRAWINGS

In the drawings, in which like reference numerals indicate corresponding structures throughout the views:

FIG. 2 is a block diagram illustrating the modules present in the embodiment of FIG. 1;

FIG. 3 is a left side elevational view in cross-section of one of the card processing modules shown in FIG. 1;

DETAILED DESCRIPTION OF THE PREFERRED EMBODIMENT

In the following detailed description of the preferred embodiment, reference is made to the accompanying drawings which form a part hereof and wherein like numerals refer to like parts throughout, and in which is shown by way of illustration a specific embodiment in which the invention may be practiced. It is to be understood that other embodiments may be utilized without departing from the scope of the present invention.

Mechanical Description

Figure 1:
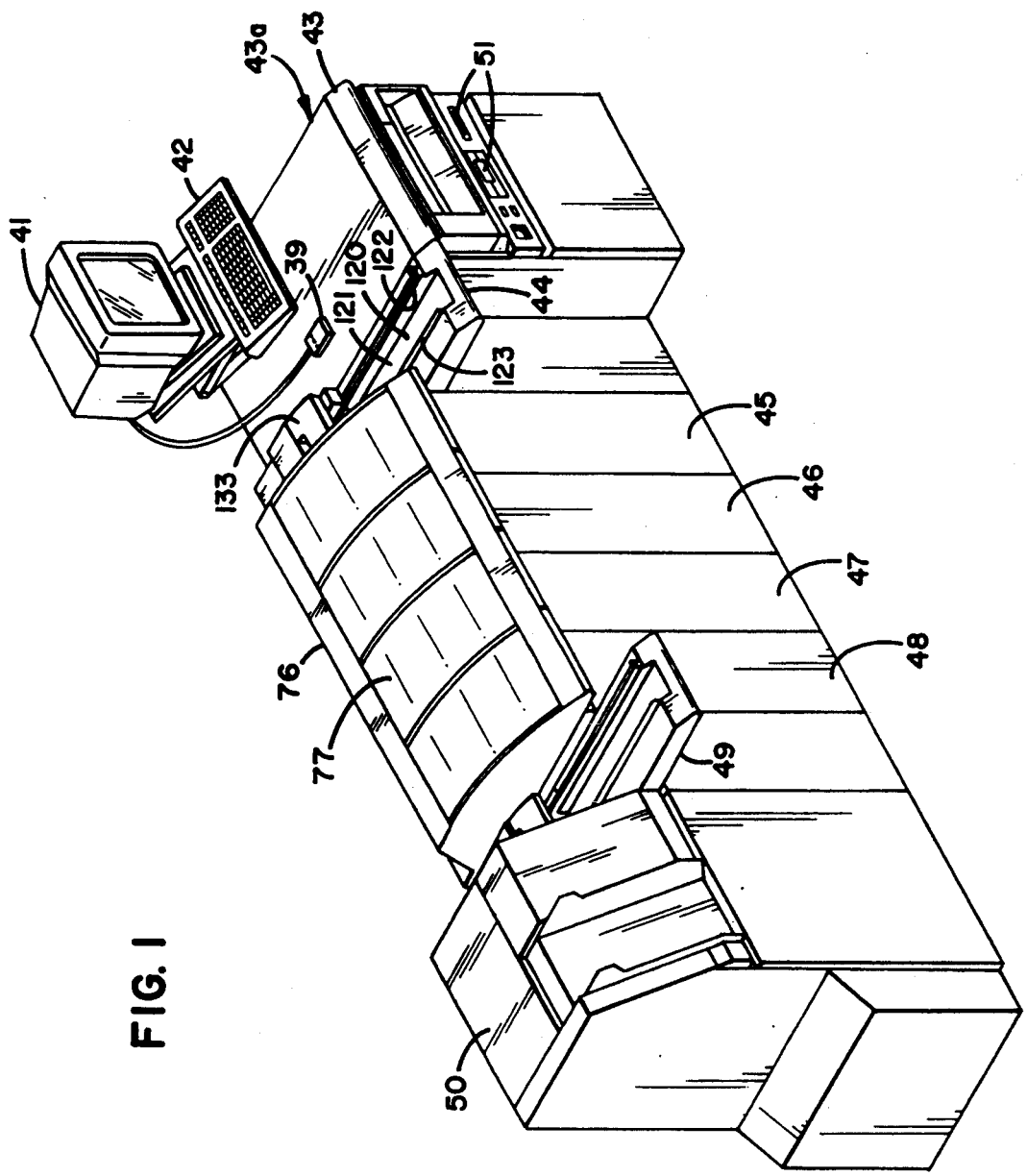
FIG. 1 is a perspective view of one embodiment of a modular card processing system in accordance with the principles of the present invention having a plurality of card processing modules.

Referring to FIG. 1, there is illustrated an embodiment of a modular card processing system 40 in accordance with the principles of the present invention showing an arrangement of sequentially integrated card processing modules, the modules being readily interchangeable, allowing for easy customization of the system for particular card processing needs through the use of a common cabinet and chassis design, and common communication means. In the system 40 illustrated, there is provided a CRT display 41 for display of system information, a keyboard 42 or a pointing device 39, such as a mouse, trackball, touch screen, pen light, etc., for operator input, and a system controller 43 which controls operation of the card processing system 40. In the embodiment shown, the system controller 43 and its associated peripherals are disposed in a rectangular housing structure 43a at the upstream end of the modules (card movement being defined in a downstream direction). The display 41, keyboard 42, and pointing device 39 are shown positioned on top of this housing structure 43a.

It will be appreciated that while in the embodiment shown and described movement is only in a downstream direction, in alternate embodiments movement of cards might be either in a downstream direction or an upstream direction. For example, a card might move upstream from one module to another module and then might move downstream to yet another module.

The system controller 43 includes a suitable processor with associated memory and in the embodiment shown, includes storage devices such as floppy and hard disk drives for storage of programs and/or card data. Other card data input devices might be present such as CD ROM, scanners, etc. Moreover, the system might be interconnected to a network for input of card data and/or other information. In one embodiment of the system controller 43, an INTEL 386SX processor is used, although other suitable processors might be used. In addition, the embodiment discussed uses OS/2 as its operating system, although once again other operating systems might be used.

The system 40 is illustrated as including a number of card processing modules, such as an input hopper module 44 for holding cards prior to processing and feeding the cards into the card processing system 40, an embossing module 47 for embossing information such as alphanumerics, logos, Japanese characters, etc. into a desired portion of a card and including an indent function for imprinting characters into a card, a magnetic stripe encoding module 45 for encoding a magnetic stripe on a card, a topping module 48 for coating portions of the card that were raised in embossing, a graphics module 46 for printing images such as optical character recognition (OCR) images, logos, photographs, bar codes, alphanumerics, etc. onto the cards, and an output hopper module 49 where the cards may be removed from the system 40. The system 40 as shown in FIG. 1 further includes an inserter module 50 where cards are attached to forms which have been printed and folded to be stacked or inserted into envelopes.

The modular system 40 described in FIG. 1 represents only one of innumerable possibilities of module combinations. For instance, a series of three alphanumeric (A/N) embossing modules may be sequentially arranged to perform a variety of embossing operations on a card, or the system 40 may just as well include only one A/N embossing module. Moreover, the present invention may be used to process any number of different types of cards made from varying types of materials.

Illustrated in FIG. 2 is a block diagram of one embodiment of a modular arrangement of the card processing system 40 shown in FIG. 1. Each of the modules are interconnected to the system controller 43 by a power bus (not shown) and a common serial bus (not shown) for transfer of electrical power and communication signals or information. In operation, the system controller 43 controls the passage of a card through the various above-described modules in a manner hereinafter described.

Figure 3B:
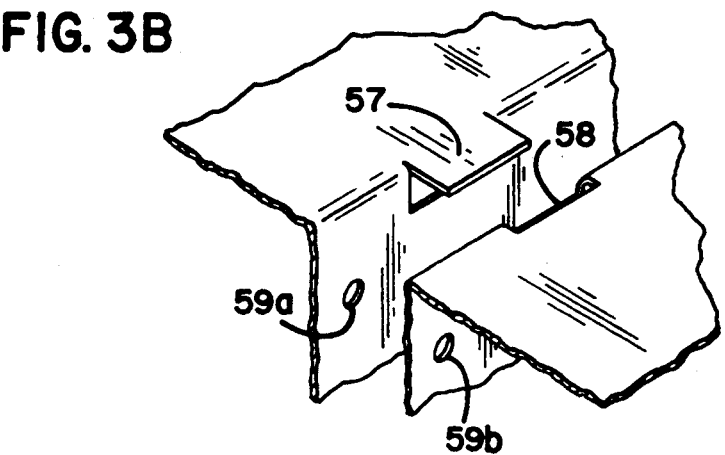
FIG. 3B is an enlarged partial view illustrating an embodiment of an alignment tab arrangement utilized to properly align the mechanical support structures of the modules.

Certain elements are common to each of the modular card processing components connected between the input hopper 44 and the output hopper 49, making possible the flexibility of adding to or modifying a card processing system. As shown in FIGS. 3 and 4, each module includes a standard chassis 60 which provides common mating surfaces and mounting hardware requirements, including structure for enabling easy replacement or addition of wheels 62 to the base 64 of the module chassis 60. A common module chassis design means that the card path inlet and outlet will be the same from one module to the next such that the inlets and outlets of adjacent modules are aligned so as to allow transfer of a card from one module to the next. In addition, the inlet and outlet of the card path for each module is provided with a suitable mechanism for ensuring proper alignment and positioning of the cards in process, as well as card detection photocells for verifying that each card is ready for transfer to the next module and that transfer has been completed. Each module is provided with uniform electrical adapters (not shown) to enable plugable interconnection of the modules by A.C. distribution wires 70 and a serial communication bus 69. The modules further include an A.C. distribution board 72 for distributing power to the module and for transferring A.C. power to its A.C. power outlet. A local module processor 75 suitably mounted on a module control circuit board 74 is present at each of the modules for converting the signals from the system controller 43 into specific card processing instructions and for controlling the local card processing functions at the module. It will be appreciated that any number of different processors might be utilized. Some modules may utilize more than one processor. One processor might be used for communications with the system controller 43 and another for data processing. In one embodiment the modules utilize the following processors:

Input Hopper Module=Intel 80C152
Mag Stripe Module=Intel 80C152 and Intel 80C196KB
Embosser Module=Intel 80C152 and Intel 80188
Topper Module=Intel 80C152
Output Hopper Module=Intel 80C152
Inserter Module=Intel 80C152 and Motorolla 68332

A card processing unit for performing a specified card processing task is situated on top of each chassis 60. A cover 76 of an appropriate width and with a window 77 for monitoring card processing production covers a portion of the card processing modules.

In addition to the elements described above, each modular chassis 60 is provided with a framework which defines a central air supply plenum 80 such that as modules are added to the system 40 the central air supply plenum 80 will remain continuous, thereby allowing unobstructed outside air flow lengthwise through the stack of card processing modules. As illustrated in FIG. 3, the framework of the plenum 80 in each module chassis 60 is defined by a plenum front panel 81 and a plenum back panel 82, the chassis base panel 64, and a plenum top panel 83. Fans 84, located in the housing containing the system controller 43, are provided for drawing outside air through air intake ducts 85 and into the plenum 80 and forcing warmer air out of openings 95,96. Openings 86 located near the base of the front and back plenum panels 81,82, as seen in FIG. 4, allow air to pass out of the central plenum 80 and to rise through channels 87,88 located in the front and rear of the chassis 60. Referring again to FIG. 3, the channel 87 in the front of the chassis 60 is defined by the plenum front panel 81 and the module front panel 89, while the channel 88 in the rear of the chassis 60 is defined by the plenum back panel 82 and the module back panel 90. As can be seen in FIG. 3, the module back panel 90 is insulated with a sound absorbing material 91, a portion of which has been removed to create an air passage 92 to allow air to rise beyond the plenum top panel 83. Air flow is allowed to continue through the card processing area 93, and into the cover area 94, where the warmer air is forced out of the unit through the opening 95 situated in the module back panel 90 and the vent 96 in a rear area of the cover 76.

Figure 3A:
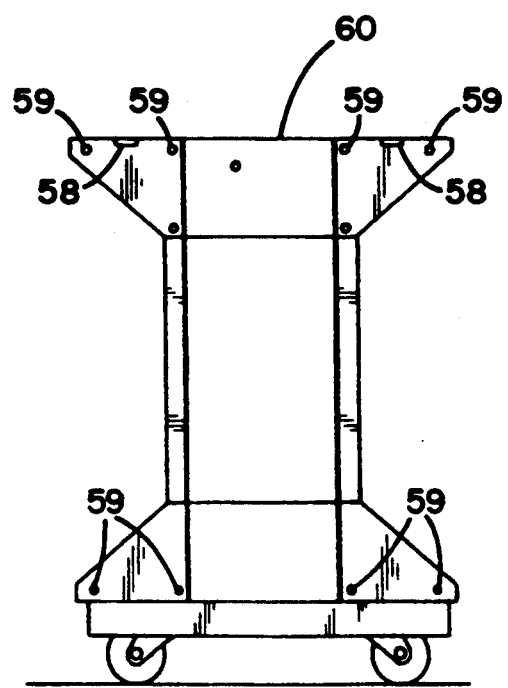
FIG. 3A is an end elevational view of a module illustrating a profile of its mechanical support structure.
Figure 4:
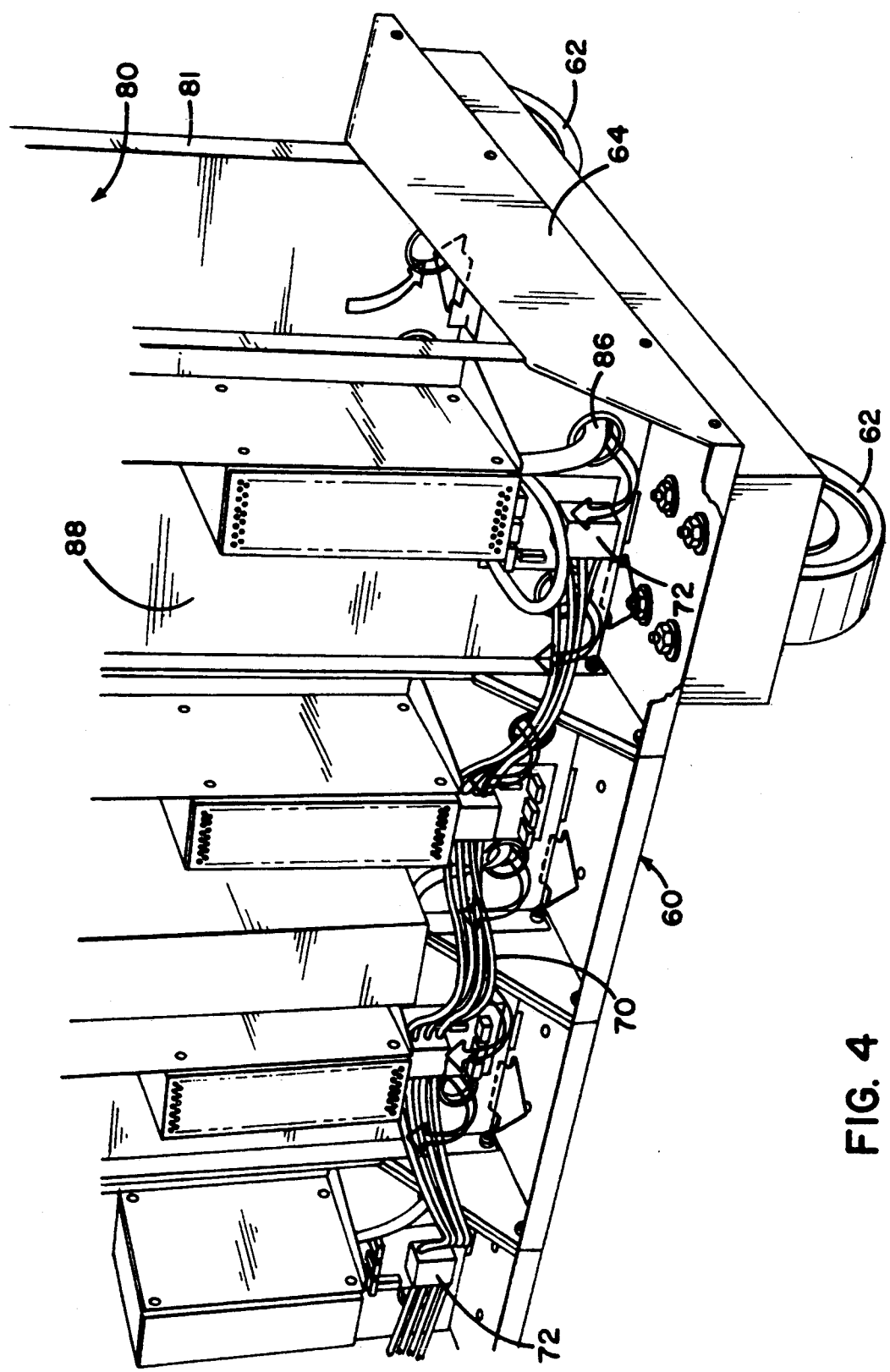
FIG. 4 is a perspective view of a fragmentary portion of the lower back portion of the card processing modules shown in FIG. 1.

Illustrated in FIG. 3A, is an end profile view of the module chassis 60 or mechanical support structure. As illustrated each chassis 60 has four openings 59 proximate a bottom surface and four openings 59 proximate a top surface. The openings 59 are vertically and horizontally aligned from module to module. Moreover, on one side of the module (upstream or downstream side), the module chassis 60 includes two slots 58 for receipt of corresponding alignment tabs 57 of an adjacent module. The openings 59a on one side of the module are threaded while the openings 59b on the other side of the module are not threaded. Thus when attaching or replacing modules it is very easy to interconnect them and insure that they are aligned properly so that the mechanical parts such as the card track from one module to the next is aligned. The alignment tabs 57 are inserted into their corresponding slots 58. Next thread fasteners are inserted into the apertures 59b without threads and are threaded into the threaded apertures 59a of the adjacent module. It will be appreciated that the apertures 59, slots 58, and tabs 57 may be either on the downstream or upstream side. However, once a side is chosen, then in the embodiment shown, the same side must be chosen for all modules so that all modules will have the same configuration and readily connect together.

In one embodiment the apertures 59 horizontally spaced 4.5 inches apart and vertically spaced 21.88 inches apart. The air plenum is 8 inches wide. The module chassis 60 is 23 inches from top to bottom and has a width of 20 inches without its removable panels on the front or back. The card path is defined as 7.25 inches above the top of the chassis 60.

The module chassis 60 is shown as having generally an I-shaped profile with the plenum 80 being disposed down the midportion of the module. Each of the modules might be mounted on adjustable wheels or they might be totally supported by their adjacent modules. It will be appreciated that in some embodiments the modules might be simply aligned with each other and not necessarily fastened together. The alignment tabs 57 might be simply inserted into the slots 58 to insure proper alignment.

Figure 5:
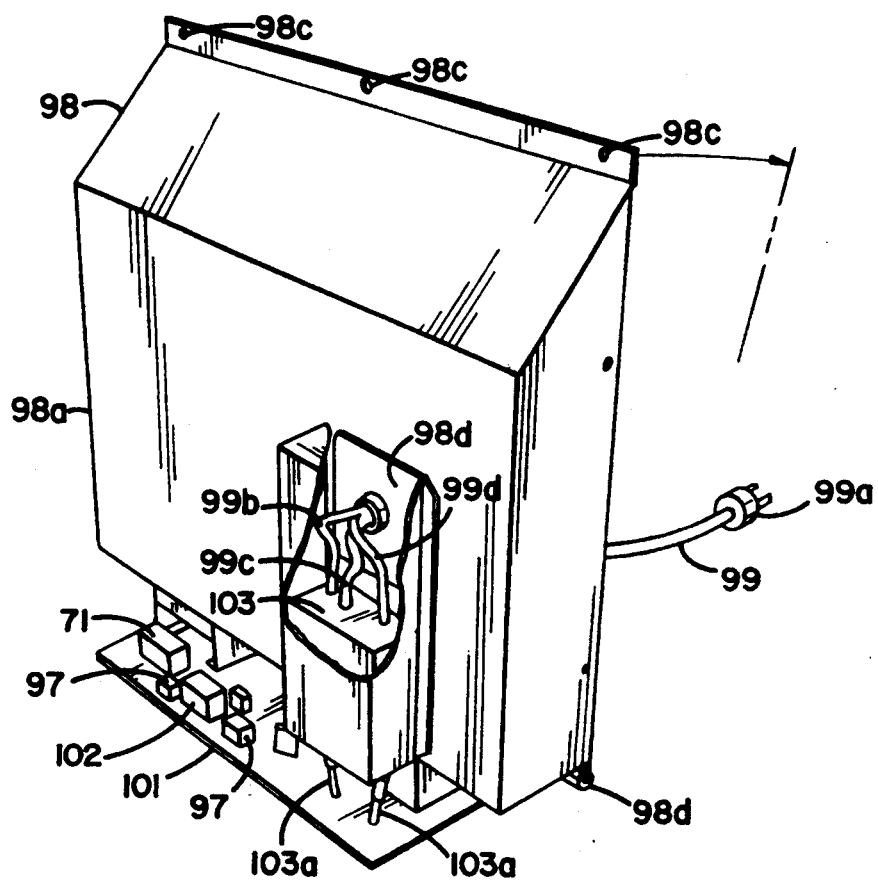
FIG. 5 is a perspective view of the inside of an alternating current (AC) power input module, electromagnetic interference (EMI) filter, and AC power circuit board present in the embodiment of the card processing system shown in FIG. 1.

The present invention provides a structure within the system controller 43 for variable adjustment of the system so as to utilize the external power source available, which typically may be 110 volts or 220 volts single phase or 220 volts two phase. An A.C. power input module 98 is situated beneath a rear access panel of the system controller 43 housing structure. Referring now to FIG. 5, the A.C. power input module 98 includes a housing 98a which is mounted pivotally mounted along its bottom edge by a hinge 98b to the system controller housing structure. Apertures 98c are provided to enable insertion therethrough of fasteners into corresponding apertures in the system controller housing structure. When one wishes to access the A.C. power input module, one can simply loosen these fasteners and pivot the housing 98a outward. The housing 98a cooperates with the system controller housing to provide a recess or cavity on the outside of the system controller housing. This recess or cavity can be used for storage of manuals, electrical cords, etc.

Interconnected to the A.C. power input module is an external power cord 99 which includes a suitable end plug 99a for plugging into an available power outlet (in this embodiment the power cord 99 is shown as having three wires 99b,c,d). It will be appreciated that should the configuration of the power outlet not correspond to the plug 99a, the plug 99a can be readily replaced. In the embodiment shown the power cord 99 is externally mounted to the housing 98a by a plate portion 98c.

The housing 98a is mechanically mounted onto an A.C. power circuit board 101. Mounted on the board 101 are various electrical components such as a circuit breaker 100, a solid state relay 240, electromagnetic interference (EFI) filter 103, a terminal block 71, A.C. universal outlets 97, etc. The specific configuration and layout of the A.C. power circuit board 101 is discussed hereafter. The EFI filter 103 is mechanically mounted to the housing 98a. In addition wires 103a from the EFI filter are soldered to electrically conductive traces (not shown) on the board 101 so as to provide the electrical connection between the board 101 and the power cord 99. The board 101 includes suitable electrical traces to electrically interconnect the electrical circuits which are mounted thereon. In one embodiment, copper traces equivalent to twelve to fourteen gauge copper wire are used.

The housing 98a is mechanically attached to the board 101 through various ones of the components on the board 101, e.g., the circuit breaker 100. Thus when the housing 98a is pivoted outward, the board 101 is pivoted therewith. Moreover, as shown, the board 101 in the preferred embodiment has a greater width than the housing 98a such that a portion of the board 101 and its electrical components are readily accessible from the outside of the system. Moreover, should it be necessary to remove the A.C. power input module, the entire module can be removed as a unit by releasing the housing 98a at its hinges from the system controller and electrically disconnecting the modules, various peripherals, system controller circuit board, etc. from the A.C. power board by use of plugable connectors.

Figure 6:
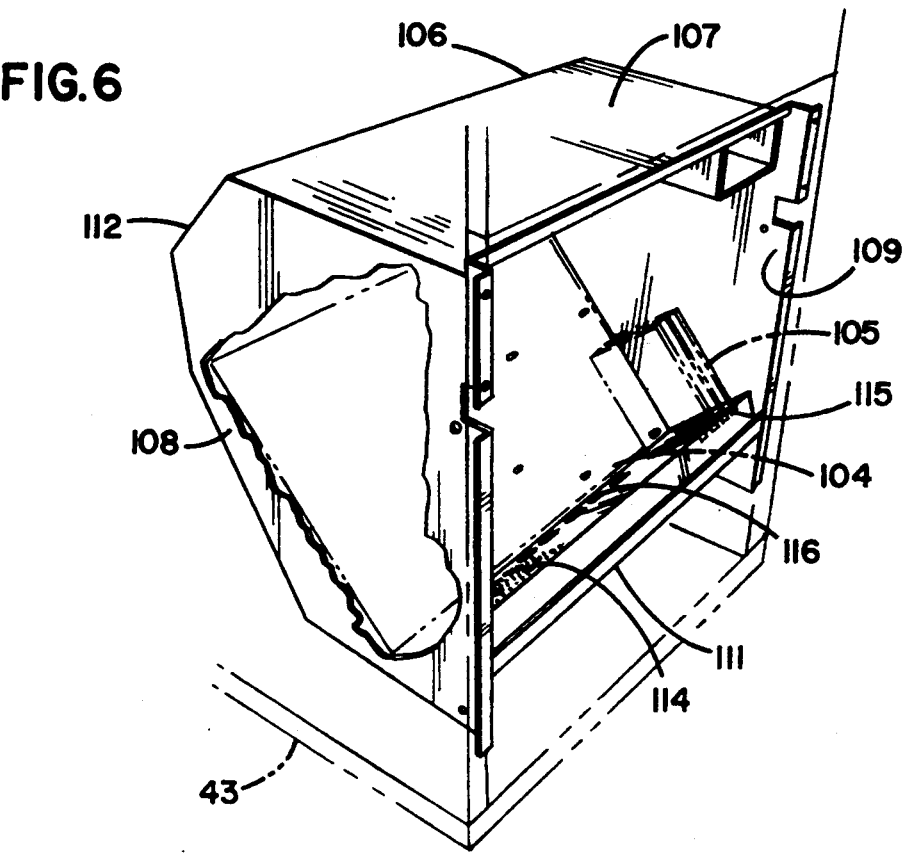
FIG. 6 is a perspective view of a system controller circuit board housing of the card processing system shown in FIG. 1.

As shown in FIG. 6, in order to facilitate access to a system controller main circuit board 104 and circuit cards 105 which might be mounted thereon, a removable circuit board housing 106 with an angled circuit board mounting base is provided in a lower front region of the controller chassis 43. The embodiment of the circuit board housing 106 as illustrated may be formed of sheet metal and is entirely enclosed except for a substantial access opening in the front of the housing 106. The circuit board housing 106 consists of a top panel 107, a left side panel 108, a right side panel 109, a bottom panel 110 which is rotated at a 45-degree angle relative to the front plane of the controller 43, a short front panel 111 which is formed at a right angle to the bottom panel 110 and concludes where it meets the plane defined at the front of the housing 106 by the leading edges of the side panels 108,109 and top panel 107, and a short back panel 112 which completes the enclosure of the housing 106.

Suitable structures, such as brackets or fasteners, are provided for mounting the circuit board housing 106 in the support housing of the system controller 43. Standoffs 113 are provided in the angled bottom panel 110 for mounting the system controller board 104 to the housing 106. Openings 114 have been provided in the short front panel 111 and back panel 112 for allowing air to flow through the housing 106. Slots 115 have also been provided in the front panel 111 for supporting circuit cards 105 such as serial computer system interface and bus interface cards as they are added to the system controller circuit board 104. In addition, openings 116 are also provided in the front panel 111 so that access to the controller circuit board 104 may be made from the front of the unit 43, thereby facilitating maintenance of the controller circuitry. These openings include elongated slots to allow access to the circuit cards 105 also referred to as expansion cards. In the embodiment shown, the system controller circuit board includes two circuit cards; a serial computer system interface (SCSI) card and a bus interface (BIF) card. Additional cards might be present such as a communication card for modem communications, a network card for communications on a network, etc.

The card processing system 40 as shown in FIG. 1 includes an input hopper module 44 for storing and feeding cards to the card processing system 40. It will be appreciated that any number of input hopper, card picking apparatus might be utilized with the present invention. In particular the input hopper, card picking apparatus described in U.S. Pat. No. 4,921,237, issued May 1, 1990, hereby incorporated by reference, might be used. Input hoppers of this type utilize a reciprocating suction cup mechanism to individually pick the cards from a stack of cards in a receptacle of the input hopper. However, the input hopper novel features disclosed herein offer several advantages over prior art devices.

Figure 7:
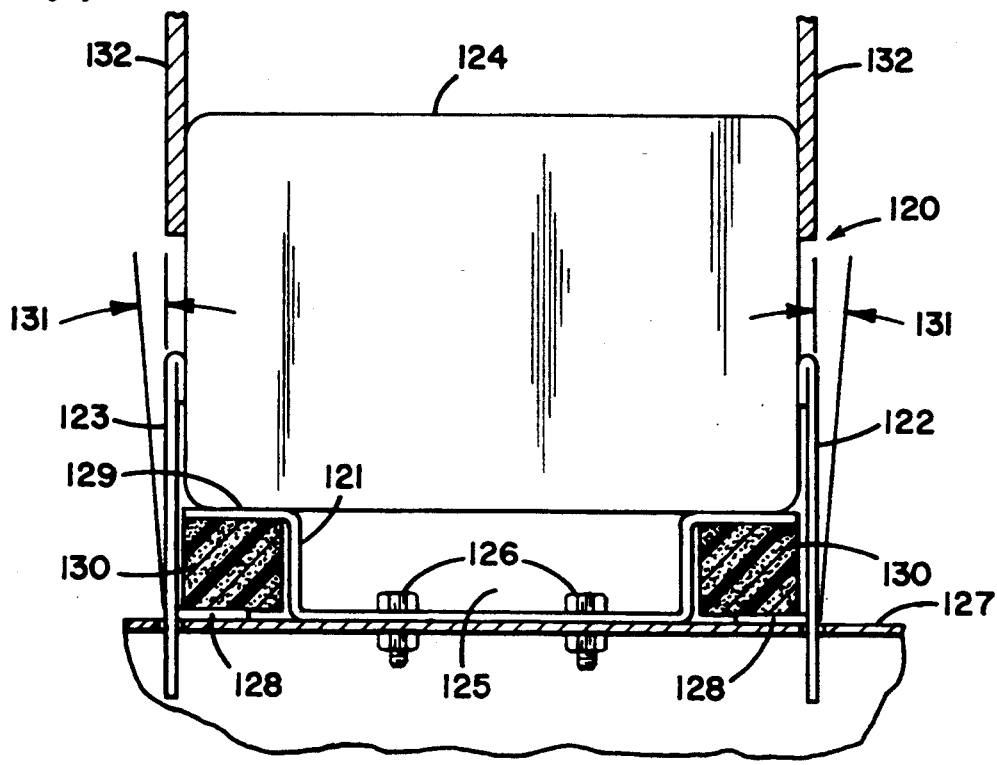
FIG. 7 is a cross-sectional view of a input hopper card retainer structure of the card processing system shown in FIG. 1.

The input hopper 44 of the present embodiment includes a hopper receptacle 120 for receiving a stack of cards 124. As seen in FIG. 7, the hopper receptacle 120 is defined by a bottom support plate member 121, a right side guide rail member 122, and a left side guide rail member 123, the guide rail members 122, 123 being substantially parallel to each other when undisturbed. The bottom support plate member 121 is generally the same width as the plastic cards 124 being processed. A trough 125 is defined in the bottom surface of the support plate 121 which is substantially narrower than the width of the base of the plastic card stack 124 and which allows for clearance beneath the stack 124 for support plate mounting hardware 126 as well as finger clearance for easy removal of a portion of the card stack 124. The left and right side guide rail members 122, 123 project into slots in the support structure 127 for angular movement pivoting at the point at which the guide rail members 122, 123 mate extend through the slots in the hopper support structure 127. An extension 128 projects perpendicularly from each guide rail member 122, 123 to a point beneath the card-engaging surface 129 of the card support plate 121.

A strip of resilient material 130 is mounted between the extension 128 and the card support plate 121 for biasing the guard rail members 122, 123 into a position perpendicular to the card support plate 121 and, therefore, parallel to the sides of the card stack 124. However, the resilient material allows the guard rail members 122, 123 to be pivoted outward as the resilient material 130 will compress as the extension 128 forces into it when pivoting the rail members 122, 123. The angular movement 131 of the guide rails 122, 123 allows for a temporary expansion of the hopper receptacle 120 when a card container 132 is introduced during loading or unloading of cards. It will be appreciated that in alternate embodiments, only one of the guide rails 122, 123 might be pivotal. The end of the hopper is open such that when placing the box of cards into the hopper, the user can hold the cards in place while pulling the box out the end of the hopper.

Figure 8:
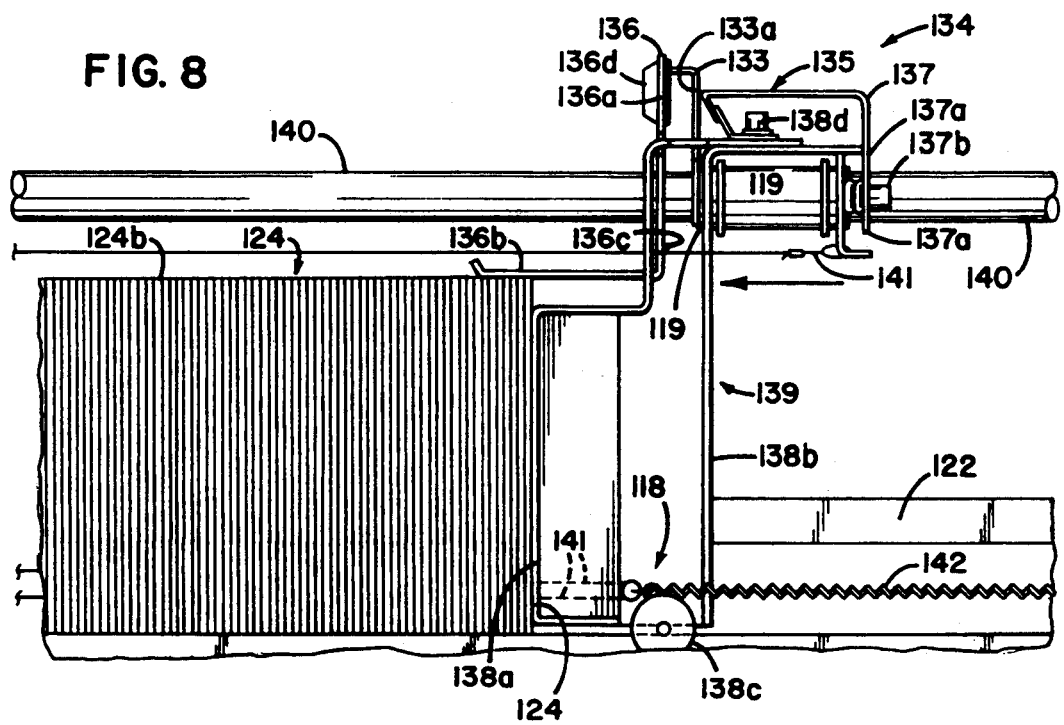
FIG. 8 is a side elevational view of an input hopper card pusher assembly present in one embodiment of the input hopper.

Another feature of the input hopper module 44 is the card pusher assembly 134, which forces the cards 124 toward a card picking mechanism (not shown) of the input hopper module 44. The card pusher assembly 134 as shown in FIG. 8 includes a handle 135 comprising a first lever 136 and a second lever 137, the levers 136, 137 being pivotally mounted on a carriage arrangement 139. A card stack pusher plate assembly 138 is supported by the carriage, a face portion 138a of the card pusher 138 providing the surface which engages the trailing end 124a of the card stack 124 with a back portion 138b including an aperture for mounting the pusher assembly 138 on a bearing 119 which in turn is slidably mounted on a cylindrical guide shaft 140. The back portion 138b is also illustrated as riding on a bearing 138b. The face and back portions 138a,b are fastened together by a fastener 138d.

The handle 135 and carriage arrangement 139 are slidably mounted on the horizontal guide shaft 140 which is situated alongside the card receptacle 120. A cable 141 is attached at one end to the carriage 139, the opposite end of the cable 141 being fixed to a biasing mechanism. In the preferred embodiment, a spring 142 is used for biasing the card pusher assembly 134 toward the card feeder mechanism 133 of the input hopper 44. Of course an alternative approach would be to use a weight.

Figure 9:
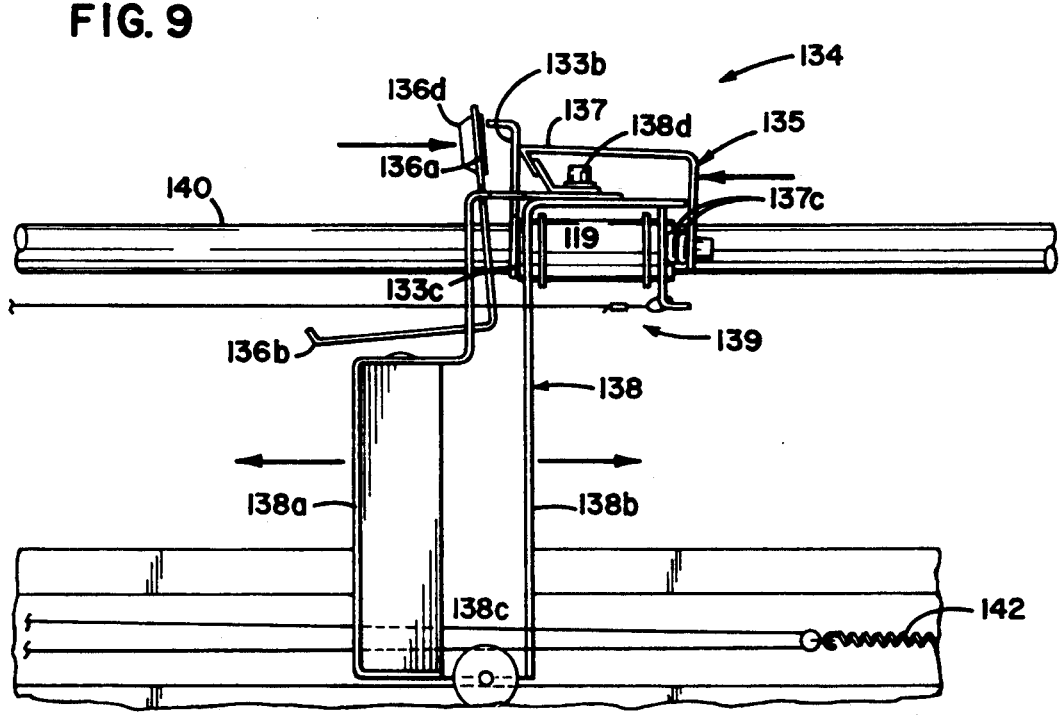
FIG. 9 is a side elevational view similar to FIG. 8, showing the card pusher assembly in a non-working position.
Figure 9A:
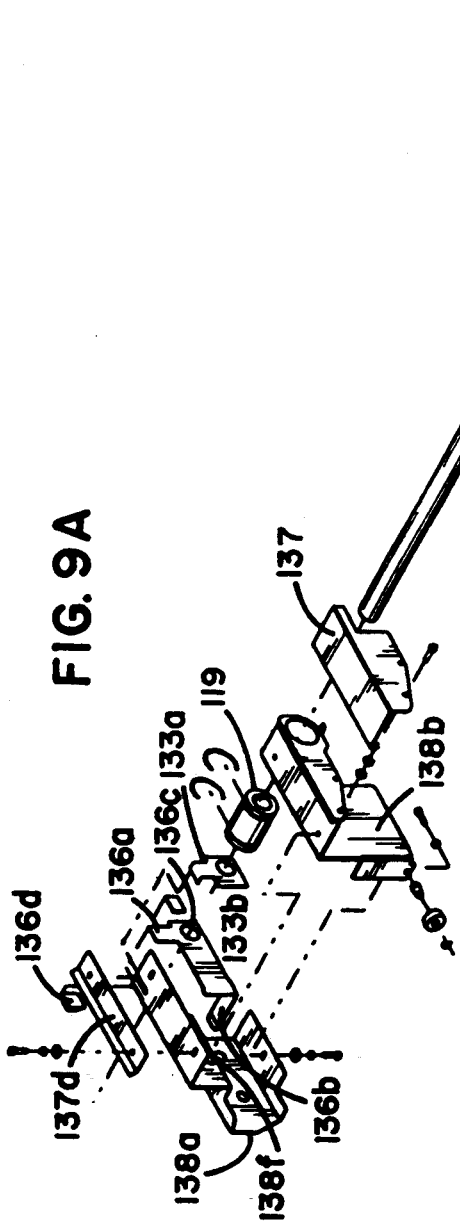
FIG. 9A is an exploded view of one embodiment of a card pusher assembly.
Figure 9B:
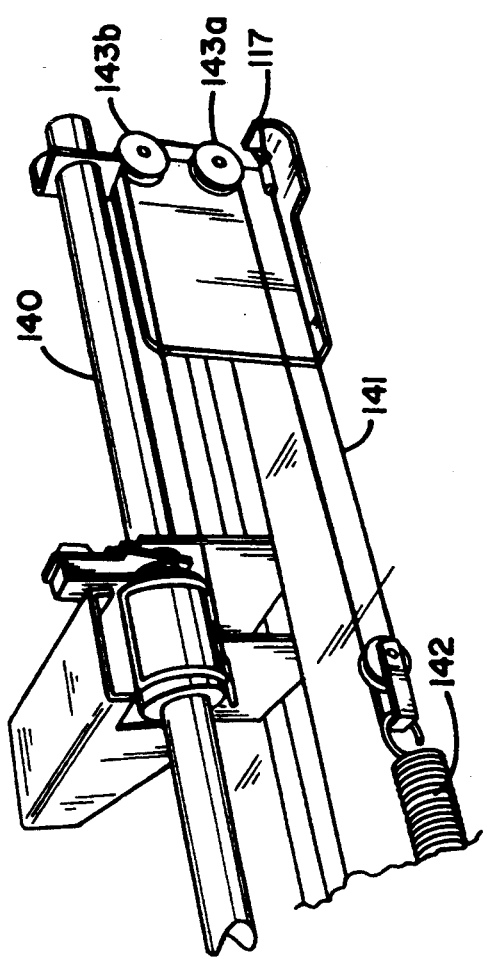
FIG. 9B is a partial side, perspective view of the card pusher assembly shown in FIG. 9A.

As shown in FIG. 9B, the cable wraps around two pulleys 143a,b proximate the card pick end of the input hopper and then feeds away from the pick end to the spring 142 which is suitably mounted to the support framework of the input hopper. The cable 141 is attached to the spring 142 by a pulley 118 and is mounted at location 117 proximate the card pick end of the input hopper. The spring thus serves to bias the card pusher assembly 138 toward the card pick end.

The first lever 136 of the handle 135 includes a tab portion 136a having a pad 136d and an outwardly projecting leg 136b which is perpendicular to the tab portion 136a, and which contacts the top surface 124b of the card stack 124. In addition, the tab portion 136a of the first lever 136 is provided with a circular opening 136c through which the guide shaft 140 passes. The tab portion 136a rests adjacent a cut away portion 138e of the face plate 138a and the leg portion 136b projects through an aperture 138f in the face plate toward the pick end of the hopper.

Referring to FIG. 8, the second lever 137 is resiliently mounted at a first end 137a to the carriage assembly 139 by a fastener 137b. Two o-rings 137c are placed between the first end 137a and the back portion 138b of the pusher assembly 138. A bracket 137d is mounted onto the face and back portions 138a,b of the pusher assembly so as to retain the second lever 137 on the carriage.

A first end 133a of a brake lever 133 projects through a slot 138g in the face plate 138a between the first and second levers 136 and 137, while a second end 133b of the brake lever 133 is provided with a circular opening 133c through which the guide shaft 140 slidably passes. The first end 133a of the brake lever 133 extends up through the slot 138b in the face plate 138a and is bent 90 degrees toward the first lever 136. The brake lever 133 pivots on the shaft and locks in place as the carriage is moved toward the front of the input hopper, away from the card picking end of the input hopper. This restrains the carriage and card stack from further motion and therefore provides the force necessary to resist movement of the card stack when cards are being picked so as to compress the suction cup of the card picking mechanism while yet allowing some initial motion of the card stack toward the card picking mechanism so that the edges of the card being picked can separate from the rest of the card stack. In one embodiment this range of motion is 0.060 to 0.120 inches.

The brake lever eliminates the need for additional mass on the card pusher assembly 138 as is typically required of prior input hoppers. As the spring 142 at the end of the cable 141, pulls the pusher toward the feeder mechanism, the linear bearing 119 aligns the brake lever 133 with respect to the shaft 140 thereby unlocking the brake lever 133 which allows the card pusher assembly to move the card stack toward the card picker mechanism at the back of the input hopper and in position for the next card pick cycle. When the picking mechanism is forced against the cards, the linear bearing 119 moves away from the brake lever 133, thereby allowing the brake lever 133 to pivot and bind against the guide shaft thereby preventing further movement of the card stack.

When the levers 136 and 137 are pinched together, the second lever 137 forces the bent tab portion on the brake lever 133 into engagement with the first lever 136 thus aligning the apertures of the brake lever 133 and the first lever 136 with the shaft 140 such that the carriage is free to move in either direction.

When the leg 136b of the first lever 136 is in contact with the card stack 124 as shown in FIG. 8, the opening 136c in the tab portion 136a of the first lever 136 is aligned with the guide shaft 140, allowing for unrestricted movement of the pusher assembly 134 in either direction along the guide shaft 140.

Referring now to FIG. 9, when the leg 136b is not in contact with the card stack 124, the tab portion 136a of the lever 136 pivots forward, causing the edges of the opening 136c to bind with the guide shaft 140, thus preventing further movement of the pusher assembly 134 toward the feeder mechanism 133.

The system operator may reposition the pusher assembly 134 by grasping the handle 135 in such a way as to "pinch" together the tab portion 136a of the first lever 136 and the first end 137a of the second lever 137. When the system operator releases the handle 135, the pusher assembly 134 is again prevented from movement by the first lever 136 and the brake lever 138.

In the preferred embodiment, the carriage 135 can be rotated about the shaft 140 so as to facilitate loading of cards into the input hopper. For example, cards can be loaded in front of the pusher plate 138 on the side away from the pick mechanism while the input hopper is inputting cards into the system. The carriage 135 can then be rotated 90 degrees so as to be out of the way and the cards moved toward the pick mechanism. The carriage 135 can then be pulled back toward the operator away from the pick mechanism, and rotated back into position so as to retain the entire card stack. This can be done relatively quickly during operation of the system so as eliminate the need to stop the system to reload the input hopper.

Figure 10:
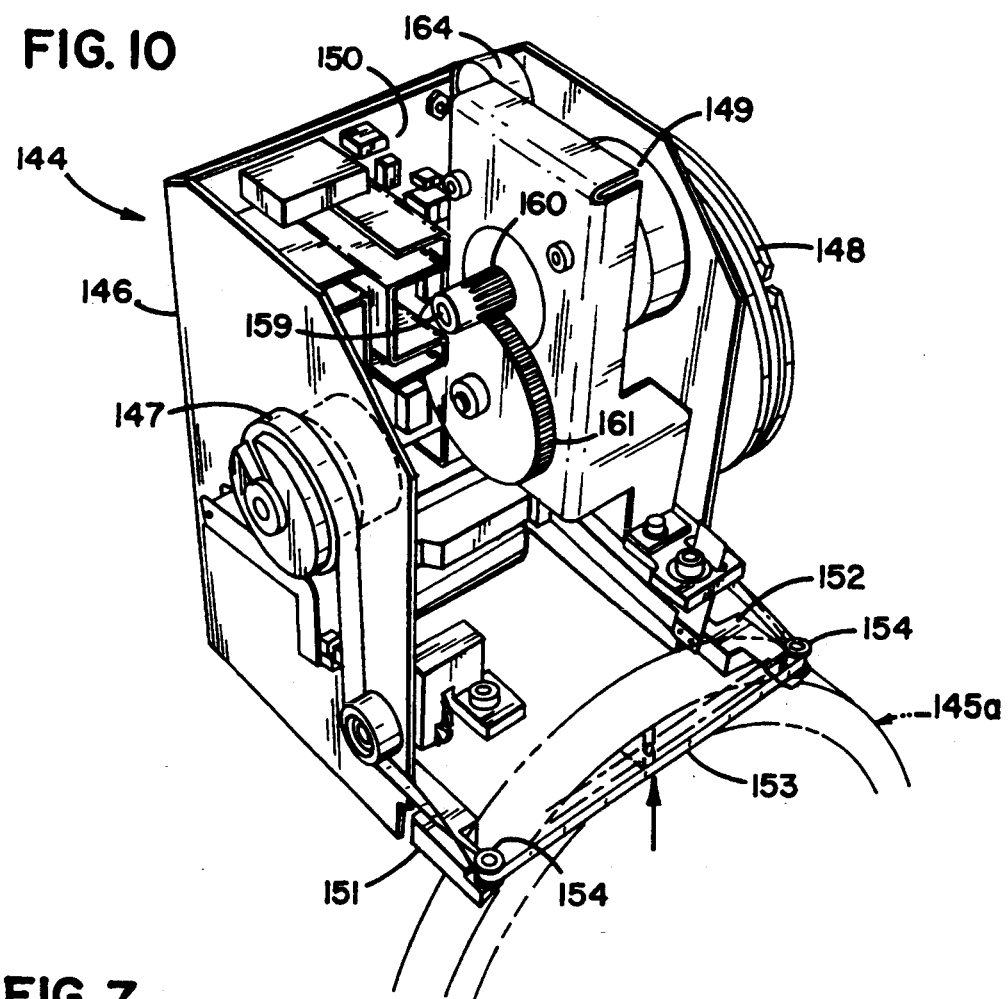
FIG. 10 is a perspective view of an indent module of the card processing system shown in FIG. 1.
Figure 11:
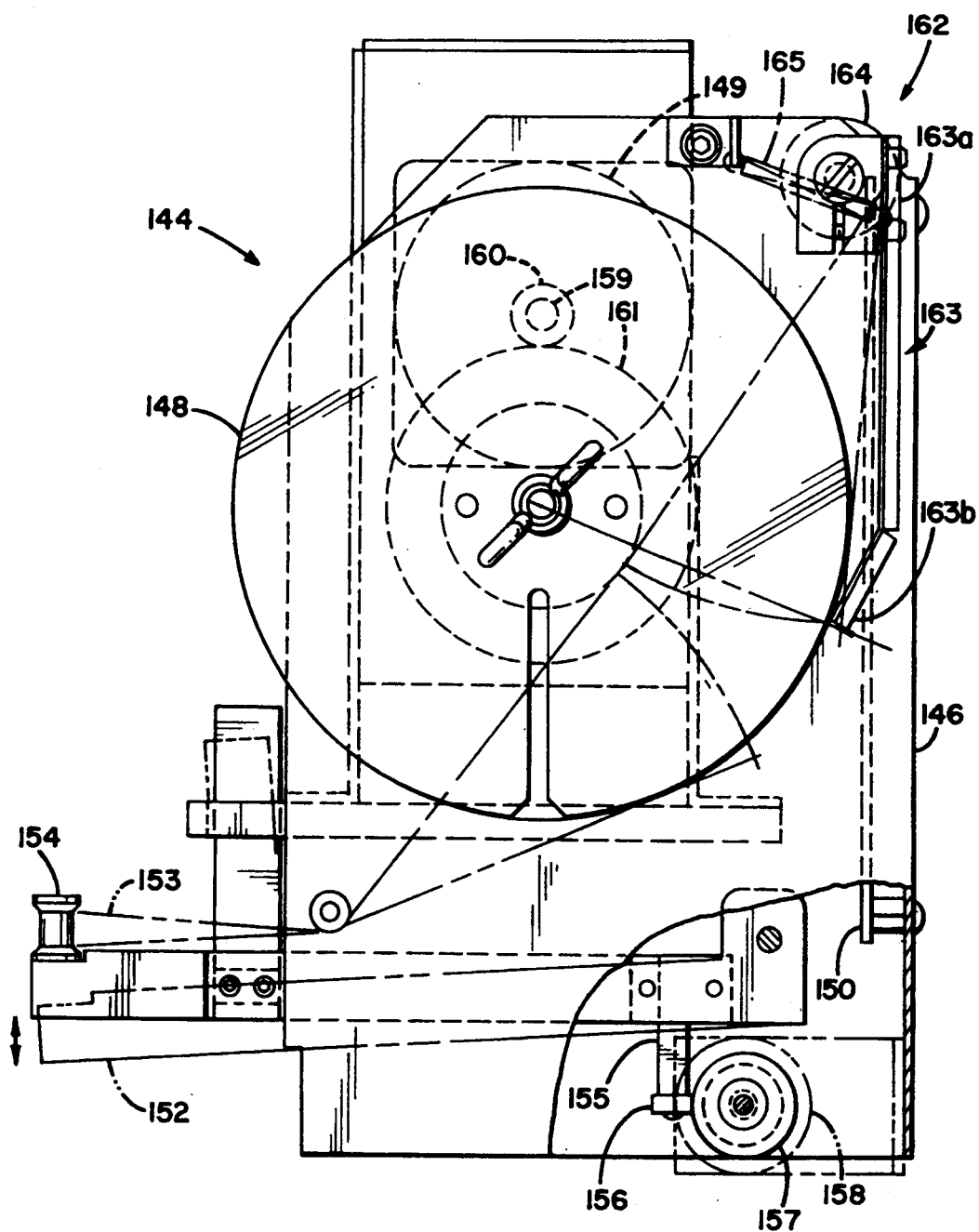
FIG. 11 is a right side elevational view of the indent module of FIG. 10.

The alphanumeric embossing module 47 of the above-described card processing system 40 is provided with an indent module 144, the structure and use of which will now be discussed. The indent module 144 of the present invention is an apparatus for imprinting information on the back and/or front of a card. In the embodiment shown, this is done while the card is alternately undergoing an embossing operation. However, the indent module might of course be used without an embosser or might be located in a separate module apart from the embosser. An indent module 144 is illustrated in FIGS. 10 and 11. As shown in FIG. 10, the indent module 144 is situated in the alphanumeric embossing module 47 adjacent the embossing wheel 145. The indent module 144 comprises a housing 146 on which is mounted a printing tape supply reel 147, a tape takeup reel 148, a motor 149 for driving the takeup reel 148, a control circuit board 150, and left and right guide arms 151, 152 for positioning the tape 153 between the card and an embossing wheel 145.

In the embodiment of the alphanumeric embossing unit 47 shown, a rotary character embossing/indenting wheel 145 has two portions 145a,b situated on either side of the card to be embossed and/or indent printed. In the embodiment shown, one embossing wheel portion 145a employs positive, or raised, characters, whereas the other embossing wheel portion 145b employs corresponding negative, or sunken, images. When indent printing is desired on the card, the positive embossing wheel 145a is used to impress characters into the surface of the card. The negative embossing wheel portion 145b will rotate to a blank face to prevent the image imprinted on the card from raising an image on the opposite side of the card. It is to be appreciated that the characters required for imprinting on the card will be mirror images of characters used in the embossing which is read on the opposite side of the card. Therefore, in a situation where embossing and indenting are performed at the same module, the positive embossing wheel portion 145a will necessarily be provided with two sets of characters for embossing or imprinting information on either the front or the back side of a card. It will be appreciated that the embossing wheel 145 may have any number of different configurations. For example, the embossing wheel might actually comprise two separate wheels, the wheels might only include embossing and/or indenting characters, etc.

The indent module 144 as depicted in FIG. 10 includes a mechanism for coloring the characters imprinted on the surface of the card. The printing tape 153 from a supply reel 147 is passed around guide rollers 154 positioned on the ends of guide arms 151, 152 which extend from the indent module 144. The guide arms 151, 152 position the tape 153 between the side of the card to be imprinted and the positive embossing wheel portion 145a, however the guide arms 151, 152 normally position the tape 153 out of the embosser's path until indenting in the side of the card is desired.

As shown in FIG. 11, a tape guide arm 152 is also provided with an extension 155 and a roller 156 situated on the distal end of the extension 155. The extension roller 156 engages the surface of a cylinder 157, the diameter of the cylinder 157 being greater at an end opposite the point of engagement with the extension roller 156 when the indent module 144 is at rest. The cylinder 157 slides on an axis perpendicular to the axis of the guide arm extension roller 156, its position being determined by a solenoid 158 in communication with the module's processor.

A signal from the module's processor 75 causes the solenoid 158 to move the cylinder 157 such that the extension roller 156 contacts an ever-increasing diameter of the cylinder 157, thereby causing the guide arms 151, 152 to raise and resulting in the tape 153 being positioned between the surface of the card and the positive embossing wheel 145a for coloring the characters being imprinted into the surface of the card.

Referring now to FIGS. 10 and 11, the takeup drive motor 149 is provided with a drive shaft 159 having a gear 160 attached thereto. The gear 160 in turn engages a gear 161 associated with the takeup reel 148. The amount of rotation of the takeup reel 148 is adjusted as the amount of tape on the takeup reel 148 increases so as to maintain a constant amount of tape deployment between characters. This insures that tape is not wasted and that there is no reuse of a previously used tape area. A takeup sensor 162 senses the diameter of the takeup reel 148 as it changes due to used tape being wound onto the takeup reel. The sensor 162 provides the module's processor 75 with a signal representative of the sensed diameter. The module's processor then adjusts the amount of rotation of the drive motor 149 driving the takeup reel 148 so that a constant amount of used tape is taken up onto the takeup reel 148 between the indenting of individual characters on the surface of the card. In a preferred embodiment of the invention, the drive motor 149 is a stepper motor although other drive mechanisms might be utilized.

The takeup sensor 162 as illustrated in FIG. 11 comprises a takeup sensor arm 163, mounted to a potentiometer 164, and a spring 165 for biasing the sensor arm 163 against the tape 153 accumulating on the takeup reel 148. The potentiometer 164 is mounted to the indent module housing 146 such that the shaft of the potentiometer 164 is parallel to the axis of rotation of the takeup reel 148. A first end 163a of the sensor arm 163 is mounted to the potentiometer 164, while a second end 163b of the sensor arm 163 is disposed toward the tape 153 in the takeup reel 148 by the spring 165.

As the tape 153 accumulates on the takeup reel 148, the diameter of the core of the takeup reel 148 increases, thus causing the second end 163b of the sensor arm 163 to move outwardly from the center of the reel 148. As the second end 163b of the sensor arm 163 moves, the movement causes the shaft of the potentiometer 164 to turn, thus varying the potential as read by the indent module's processor 75. As the potential varies, the indent module's processor 75 will correspondingly adjust the amount of rotation of the drive motor 149 which in turn reduces the amount of rotation of the takeup reel 148 by adjusting the number of steps the stepper motor is driven. Thus the varying potential is transduced into a resultant adjustment of the amount of rotation of the takeup reel 148 between indenting of individual characters on the surface of a card.

Figure 12:
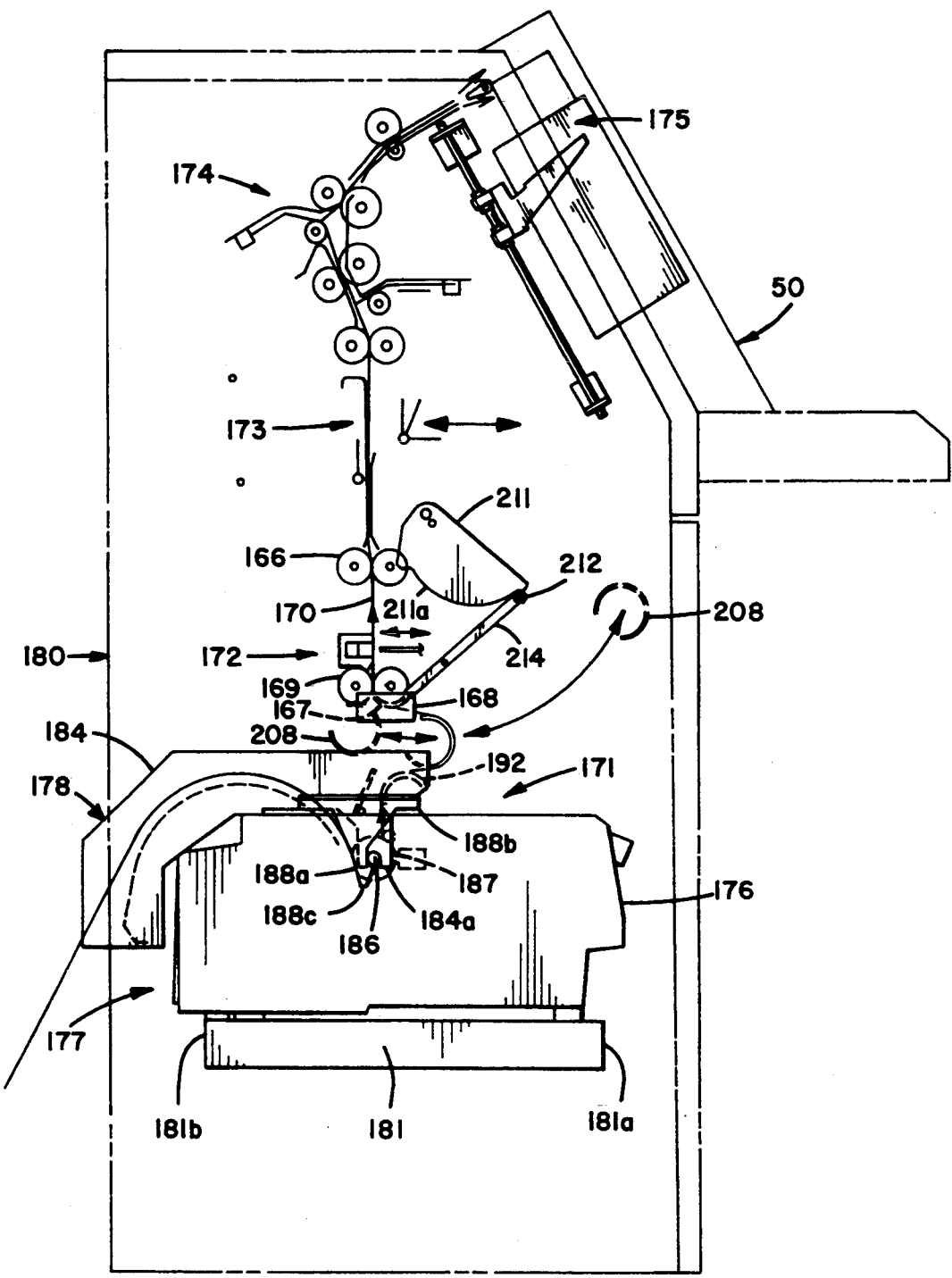
FIG. 12 is a side elevational view in cross-section, showing the path of the forms through the various stations of an inserter module of the card processing system shown in FIG. 1.

Referring to FIG. 12, an inserter module 50 is shown which includes a mechanism 171 for printing card holder specific information on a continuously fed, preprinted and perforated form 170; a mechanism 172 for separating, or "bursting" the forms 170 along the pre-existing perforations; a mechanism 173 for inserting a processed card, or cards, into pre-existing slots in the form 170 which has been printed with associated card holder information; a mechanism 174 for folding the form; and a mechanism 175 for collecting the folded and card-bearing forms or a mechanism for inserting the forms into envelopes (not shown). It may be appreciated that the general mechanism of each of the above-described operations, either singly or in combination with another, is previously known. In particular, reference may be made to U.S. Pat. No. 4,384,196 to McCumber et al., hereby incorporated by reference, which discloses an apparatus and system for preparing mailer forms and for inserting the cards to the respectively associated mailer form.

The inserter module 50 of the present invention is provided with structure such that it may be mated with any of the previously mentioned modular components.

Figure 13:
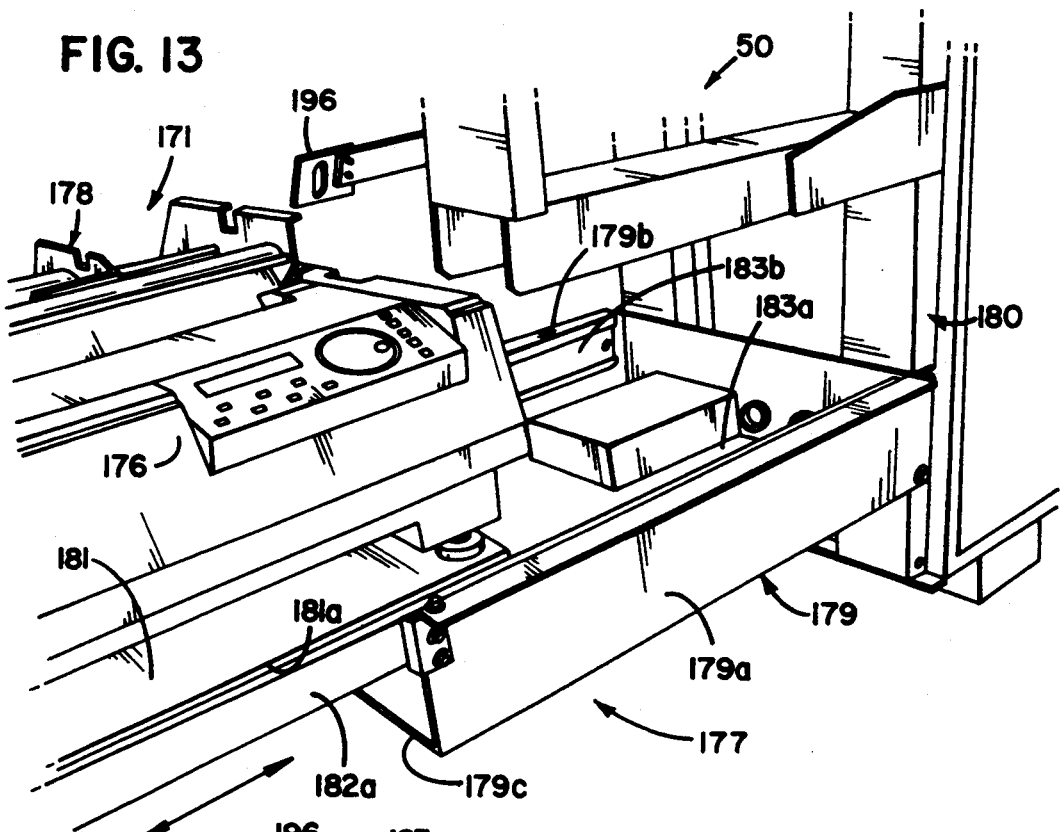
FIG. 13 is a perspective view of a fragmentary portion of the inserter module shown in FIG. 12 illustrating a printer and a printer carriage positioned outside the inserter chassis.

The inserter module 50 further includes structure which is readily adaptable for accepting a variety of printers 176 such as dot matrix, laser, thermal, ion deposition, etc., to suit the specific needs of a variety of printing tasks. The adaptable structure consists generally of a printer carriage 177 and a form guide 178. Referring to FIG. 13, a printer carriage 177 for supporting a printer 176 is shown. The printer carriage 177 consists of a printer carriage base 179 which is fixably mounted to the inserter module chassis 180 and is formed as a channel made up of front 179a, back 179b and bottom 179c sides, a support surface 181 on which the printer 176 is situated and which is sized to be slideably received in the printer carriage base 179, first 182a and second 182b rails which are mounted to the front 181a and back 181b sides, respectively, of the support surface 181, and third 183a and fourth 183b rails which are mounted to the upper inside surfaces of the front 179a and back 179b sides of the carriage base 179. First 182a and second 182b rails are slideably received by third 183a and fourth 183b rails, respectively, thus providing a structure for sliding the printer support surface 181 horizontally relative to the carriage base 179.

Upon removal of a portion of the inserter module's outside panels, access is gained to the printer carriage 177. The rails 182, 183 allow the support surface 181 to slide horizontally outward from a working position within the inserter module chassis 180 to the position as shown in FIG. 13 in which the rails 182, 183 have been fully extended. Once positioned outside the inserter module chassis 180, maintenance or replacement of the printer 176 may be accomplished.

Figure 14:
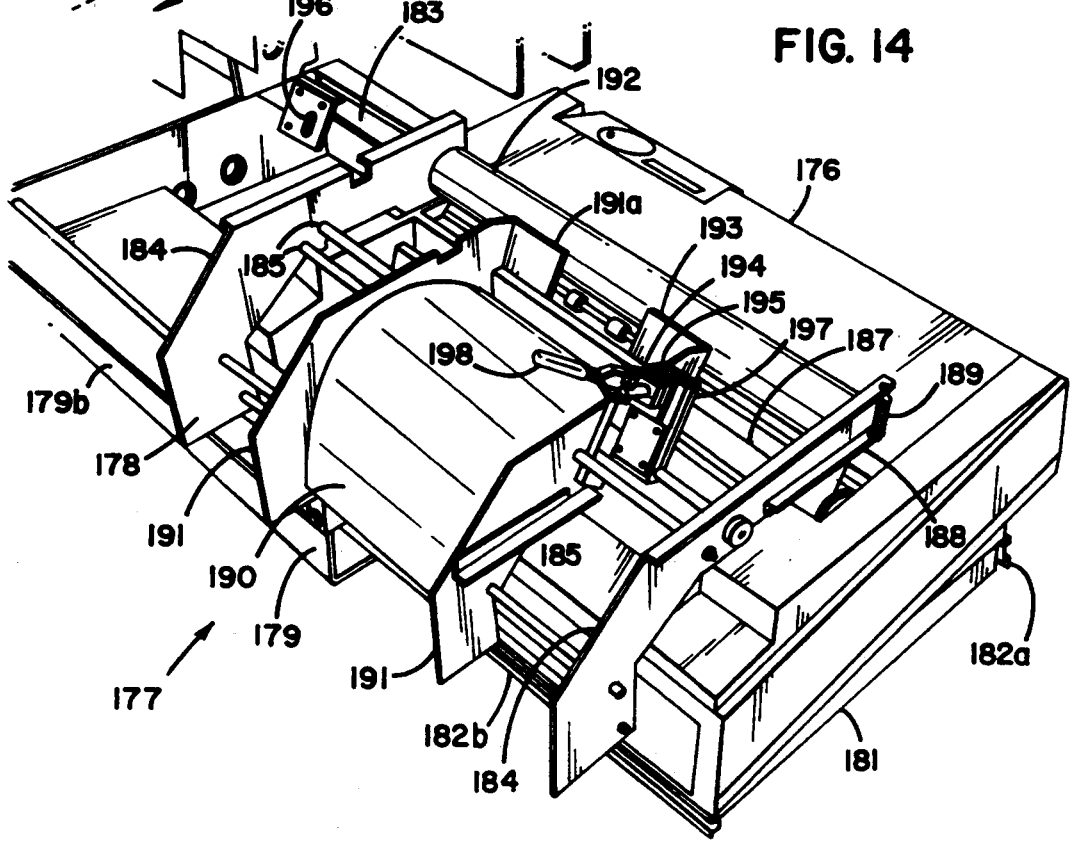
FIG. 14 is a rear perspective view of a form guide positioned above the printer of FIG. 13.

Referring now to FIG. 14, an apparatus 178 for guiding forms 170 into and out of the printer 176 is shown situated above the printer 176. Upon disengagement from the printer 176, the form guide 178 may be lifted away for easy access to the printer 176. Two outside brackets 184 form the left and right sides of the form guide 178, and are generally L-shaped to follow the contours of the top and back sides of the printer 176. Support elements 185 such as the rods illustrated in FIG. 14 are mounted between the outside brackets 184 to complete the framework for arranging the working components of the form guide 178 and to add rigidity to the structure. The support elements 185 are sized to position the outside brackets 184 over the exposed ends of the shaft 186 (shown in FIG. 12) which drives the printer's roller 187 or platen. The roller 187, in turn, drives the paper in the printer 176. As shown in FIG. 12, each outside bracket 184 is provided with an extension 184a, the end of which is slotted to engage the printer roller drive shaft 186. A lever 188 is pivotally mounted proximate the extension 184a, a first end 188a of which provided with a tooth 188c and a second end 188b is biased by a spring 189 (shown in FIG. 14) or the like, the spring 189 causing the tooth 188c at the first end 188a of the lever 188 to engage the underside of the printer roller drive shaft 186, thereby preventing the form guide 178 from becoming disengaged from the printer 176.

Referring again to FIG. 14, an arcuate guide surface 190 is provided in the form guide 178 for aligning continuous forms 170 as they are fed into the printer 176, the width of the arcuate guide surface 190 generally corresponding to the width of the forms 170 being printed. The arcuate guide surface 190 is supported between left and right paper edge guides 191, the paper edge guides 191 being mounted to the form guide 178 by the previously described support elements 185. The paper edge guides 191, as with the outside brackets 184, are generally L-shaped to follow the contours of the top and back sides of the printer 176. An end plate 193 is attached to each paper edge guide 191, and is angled to assist in deflecting upward the leading edge of the form 170 as it exits the printer 176.

As shown in FIG. 12, drive rollers 169 are used to drive the form sheets past the bursting mechanism 172 and to drive rollers 166 of the inserter. Adjacent the burster drive rollers 169 there is another set of paper edge guides 168 which guide the forms into proper alignment with the bursting mechanism 172 and the remaining mechanisms of the inserter. In addition there is an arcuate guide surface 167 for guiding the forms into the drive rollers 169 of the burster.

A cylindrical surface 192 is fixed between each of first ends of the outside brackets 184. As may be seen in FIG. 12, the cylindrical surface 192 contacts the forms 170 as they exit the printer 176 and provides a rounded surface against which the forms 170 may be deflected without causing the forms 170 to crease or tear.

As shown in FIG. 14, a device 194 is provided for positioning and locking the form guide 178 and printer carriage 177 in place upon sliding the carriage 177 into the inserter chassis 180. The locking device 194 is fixed to the form guide structure 178 as shown in FIG. 14. The locking device 194 includes a pin 195, the first end of which mates with a keyway 196 mounted to the inserter module chassis 180. The first end of the pin 195 is conically shaped to ensure centering and engagement with the keyway 196. The locking device 194 further comprises a guide block 197 through which the pin 195 slides, and a lever 198 which is mounted at a second end of the pin 195 for actuating the pin 195 between an engaged and a disengaged position.

Figure 15:
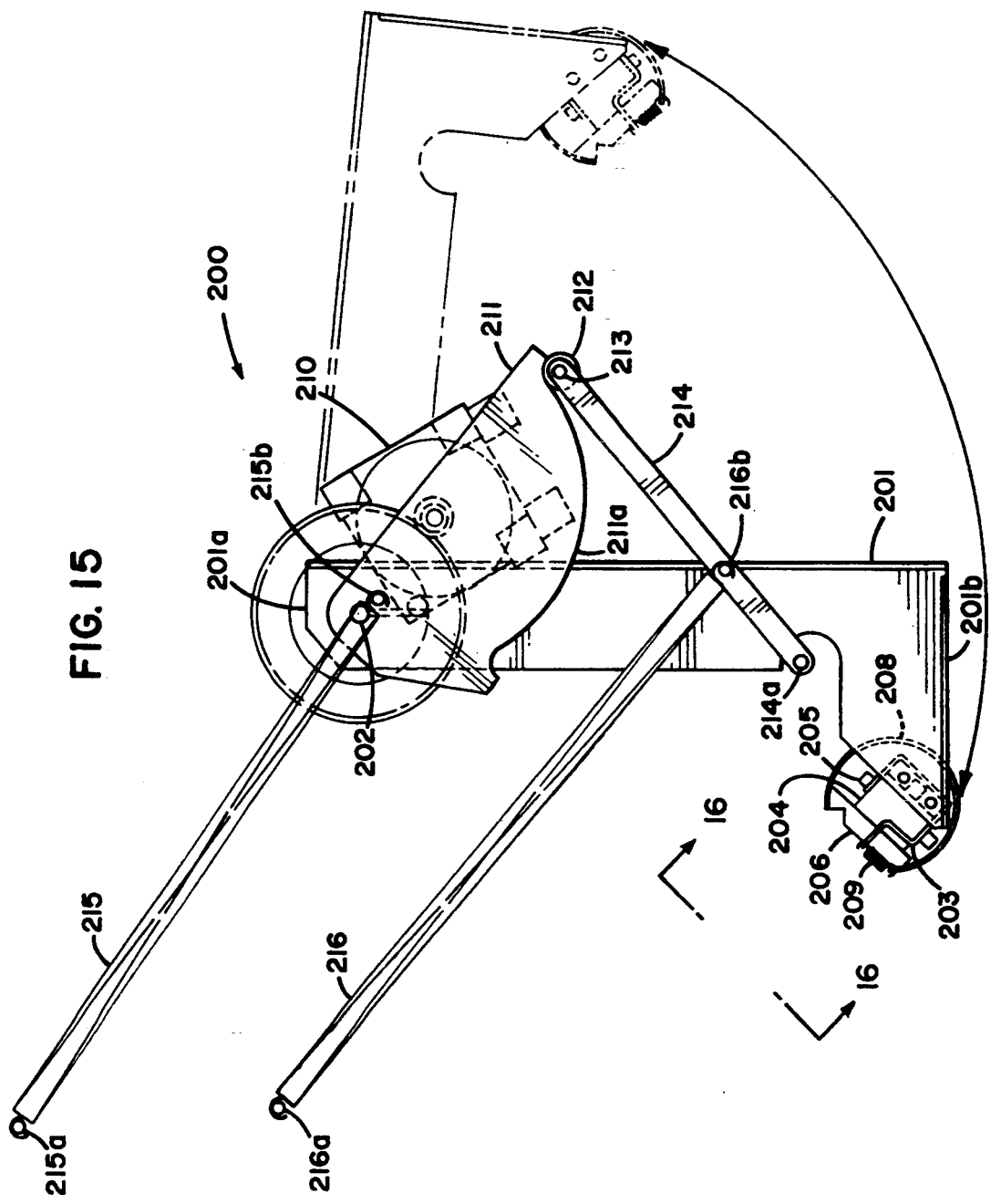
FIG. 15 is a side elevational view of a paper tensioner assembly of the inserter module shown in FIG. 12, removing from view the inserter module chassis structure.

As shown in FIG. 15, a paper takeup 200 is provided in the inserter module 50 for providing a paper accumulation capability between the printer head and the drive rollers of the bursting mechanism 172 and for maintaining the paper forms 170 in proper tension as they exit the printer 176 and proceed to the bursting mechanism 172. The paper accumulation capability facilitates asynchronous operation between the print head and the burster 172. In the preferred embodiment, there is between one and two form lengths of accumulation between the print head and the burster 172. This enables printing to begin at the top of a form since even right after the moment of bursting a form there is at least one form length between the print head and the burster 172.

As may be seen in FIG. 15, the structure of the takeup 200 begins with left and right side takeup arms 201. First ends 201a of the takeup arms 201 are mounted on either end of a shaft 202 supported horizontally by a suitable support structure in the inserter module chassis 180.

During the printing/bursting process, if the platen of the printer is not parallel with the burster drive rollers, the form paper will skew. If the takeup arms 201, or paper loop guide mechanism, is parallel with either roller, it will contact the skewed loop on one edge only, resulting in an increased tension along that edge and a tendency to tear the paper. The present invention, an embodiment of which is hereafter described, provides a loop guide mechanism which pivots about two axes so it can conform the loop to its natural state by compensating for the skew in the paper. Accordingly, the tension is taken up evenly all along the width of the paper.

Figure 16:
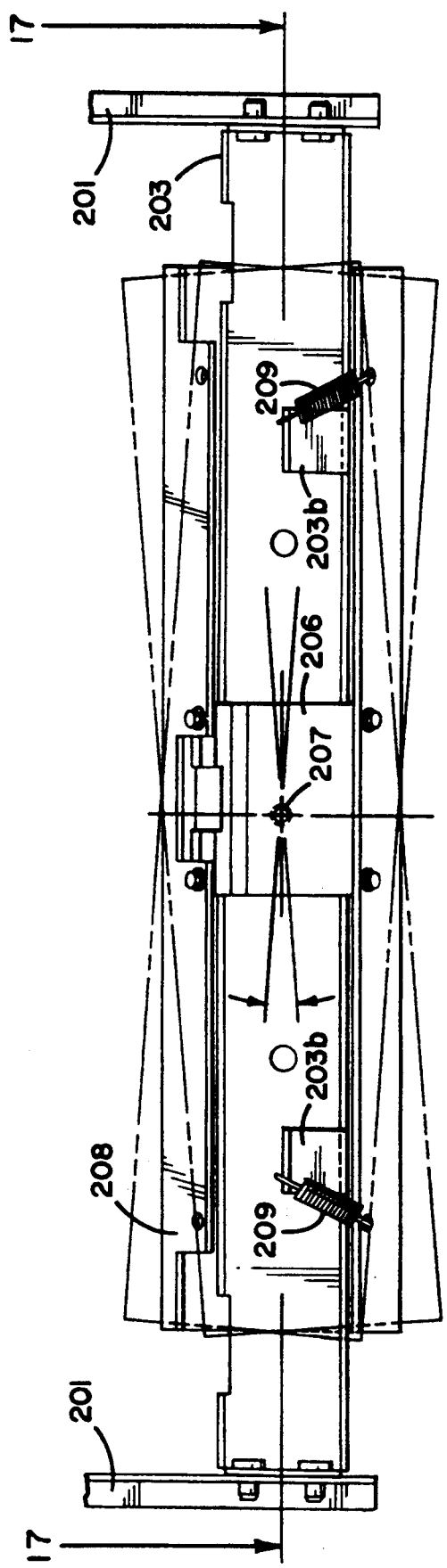
FIG. 16 is a side elevational view of a portion of the paper tensioner assembly taken generally along lines 16—16 of FIG. 15.
Figure 17:
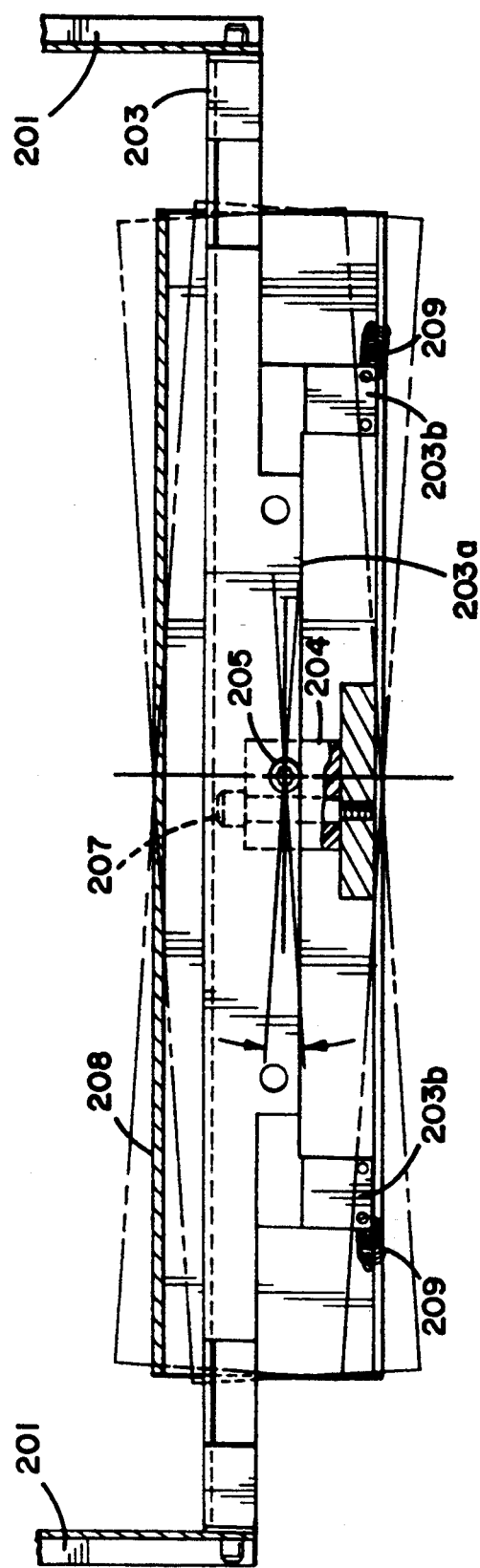
FIG. 17 is a cross-sectional view of a portion of the paper tensioner assembly taken generally along lines 17—17 of FIG. 16.
Figure 18A:
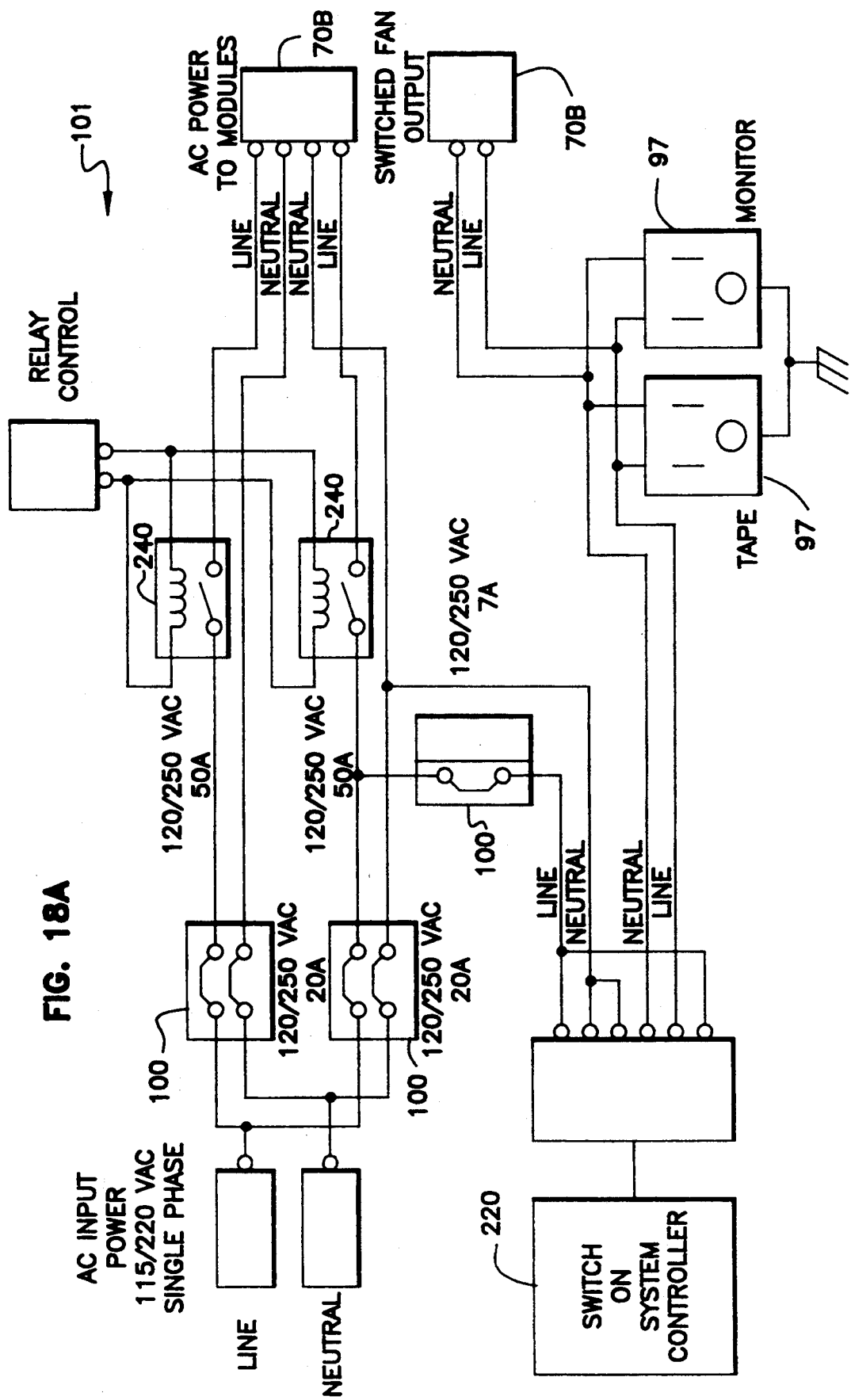
FIG. 18A is a schematic illustration of AC power interconnections to the system controller's AC power circuit board in one embodiment of the invention wherein the power input is 220 volts.
Figure 18B:
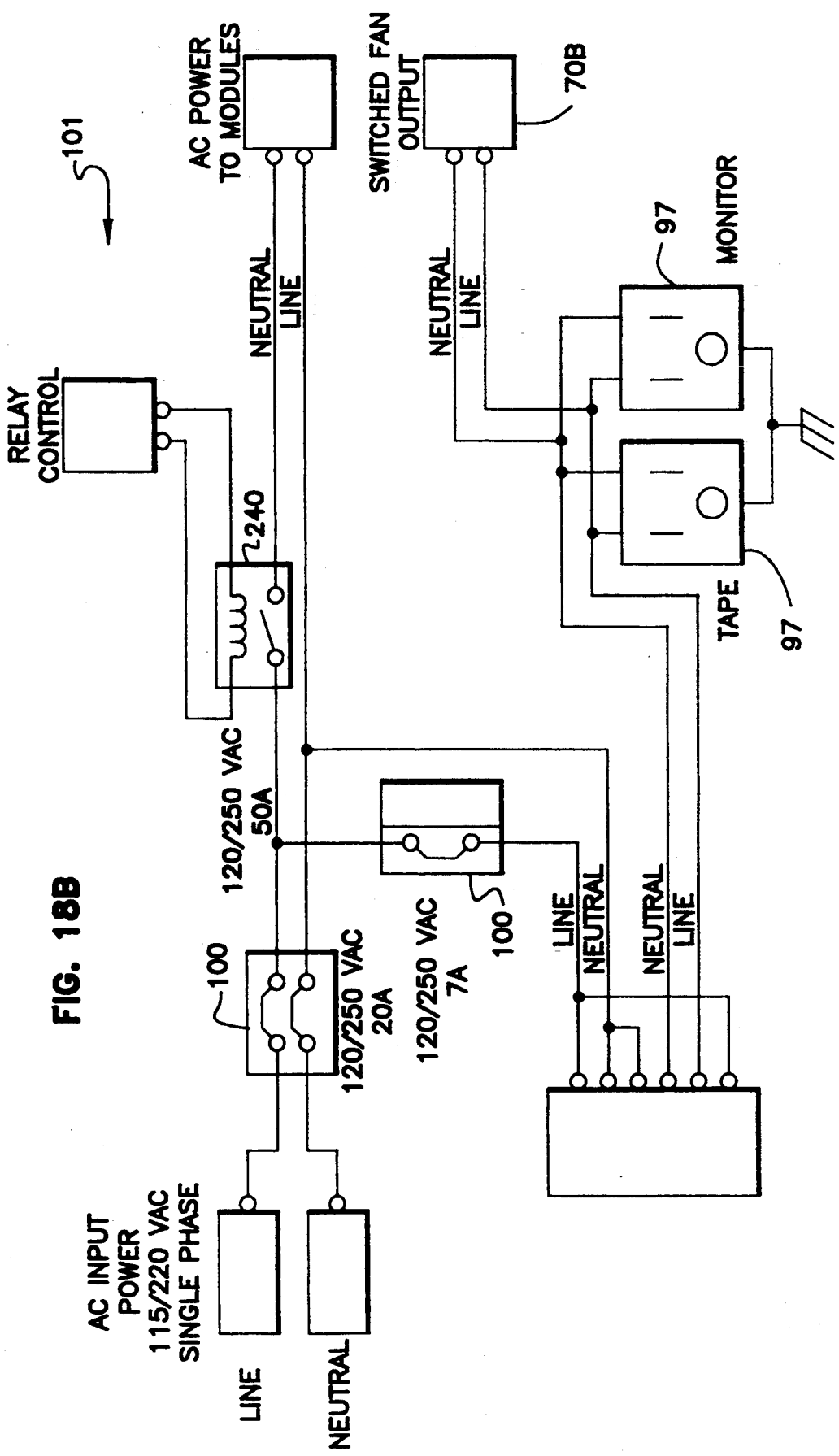
FIG. 18B is a schematic illustration of AC power interconnections to the system controller's AC power circuit board in one embodiment of the invention wherein the power input is 115 volts.
Figure 19:
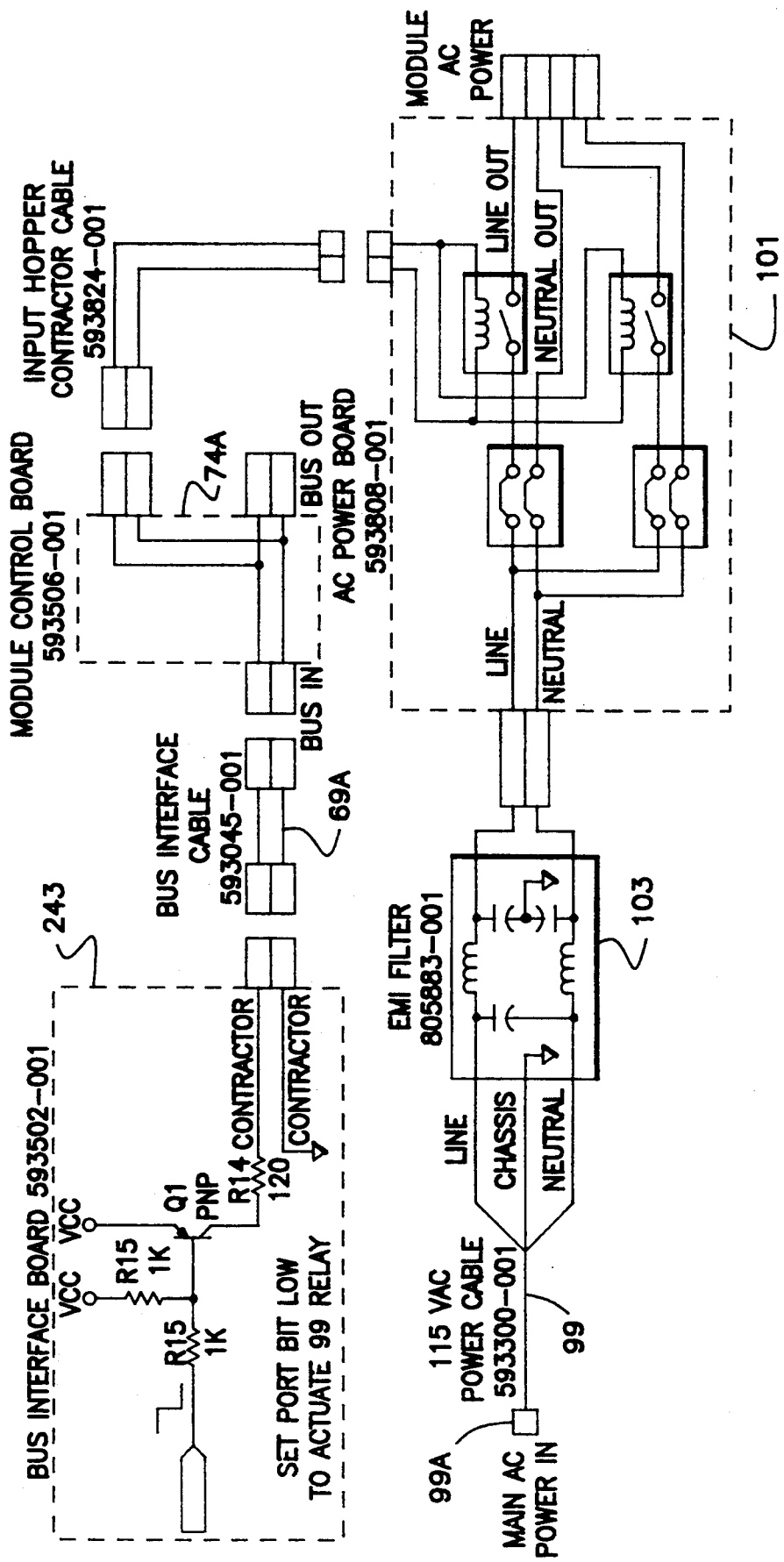
FIG. 19 is a schematic illustration of AC power distribution from the AC power circuit board of either FIG. 18A or FIG. 18B to the card processing modules.
Figure 20:
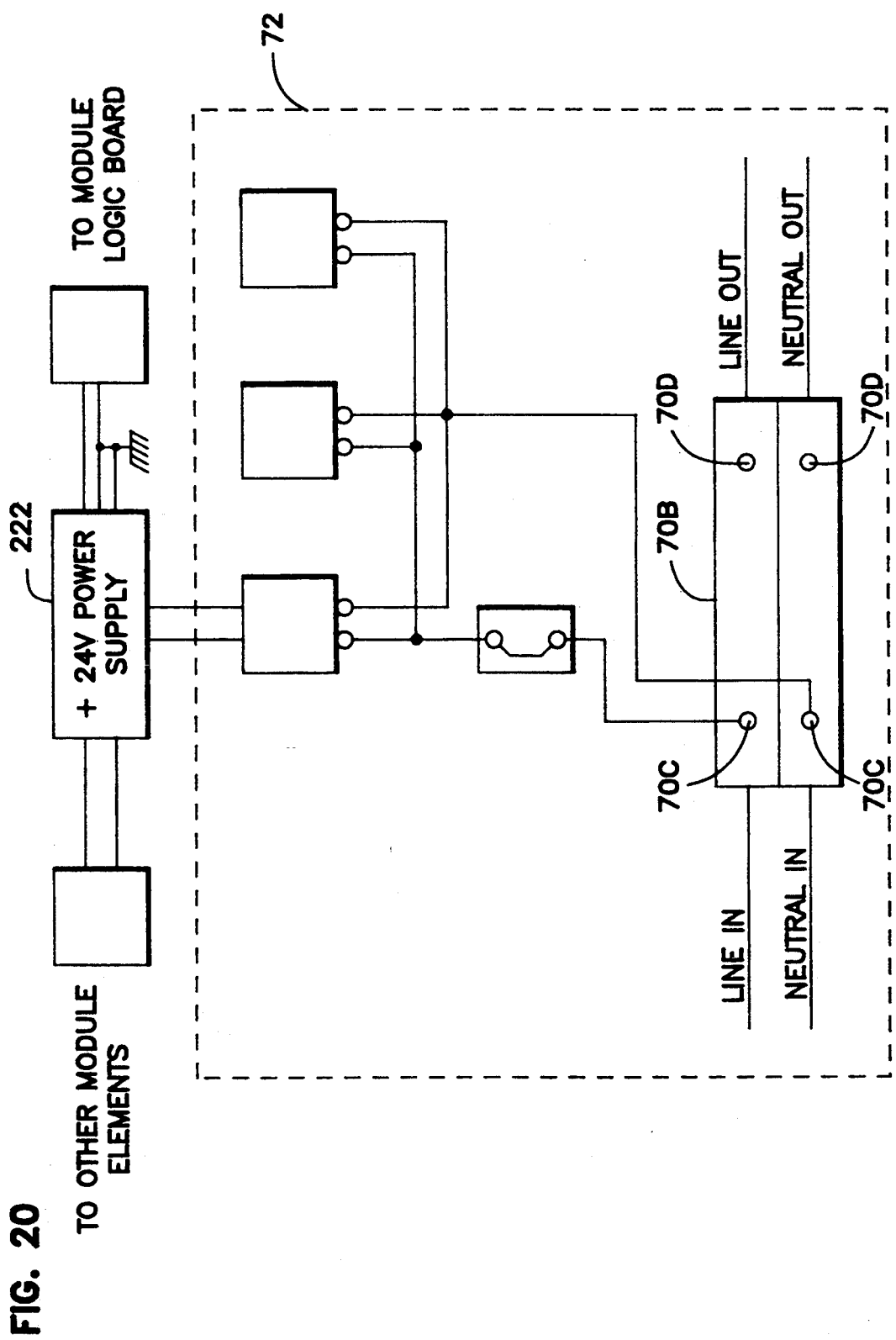
FIG. 20 is a schematic illustration of an embodiment of an AC distribution board at a module.
Figure 21:
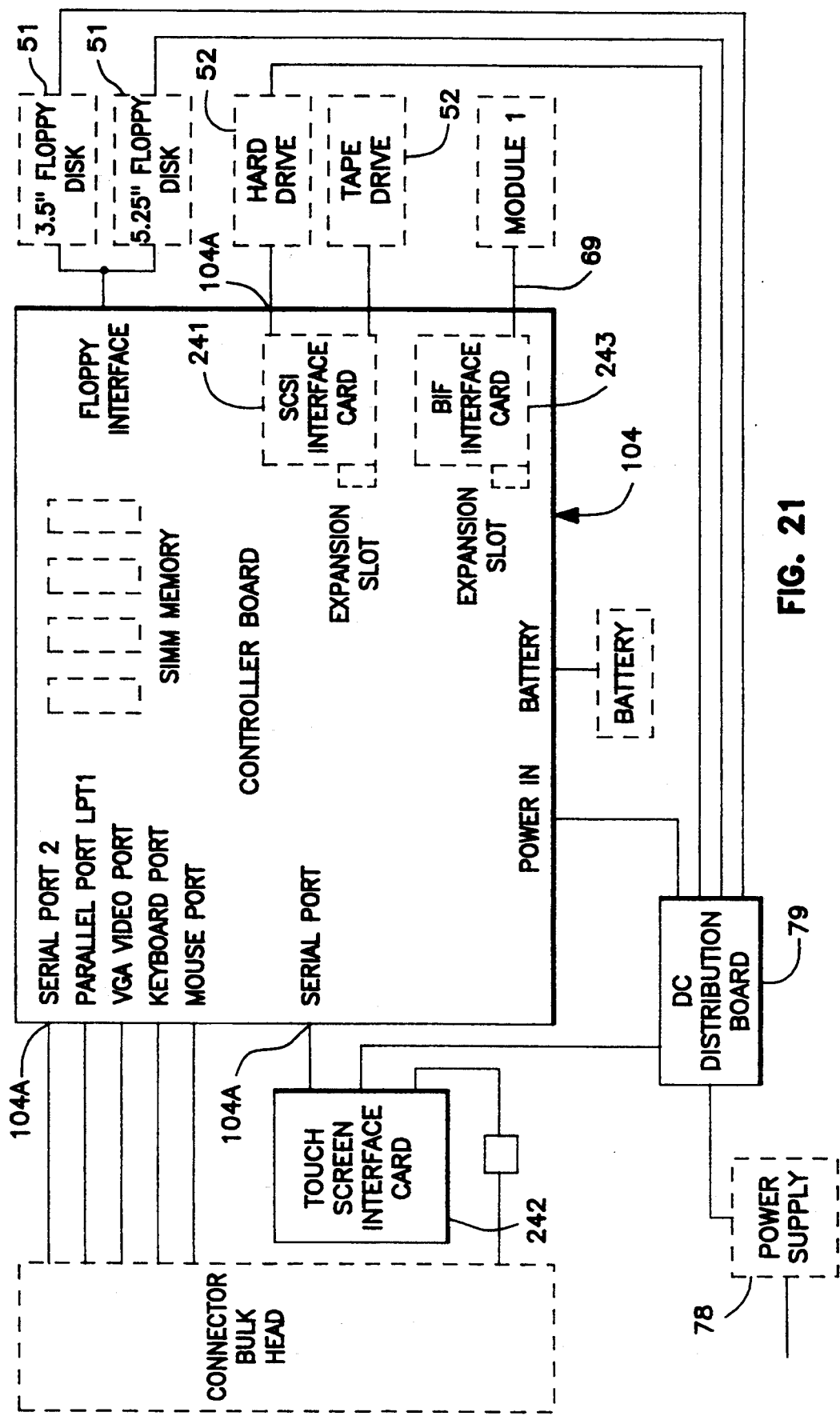
FIG. 21 is a schematic illustration of a system controller circuit board present in one embodiment of the invention.
Figure 22:
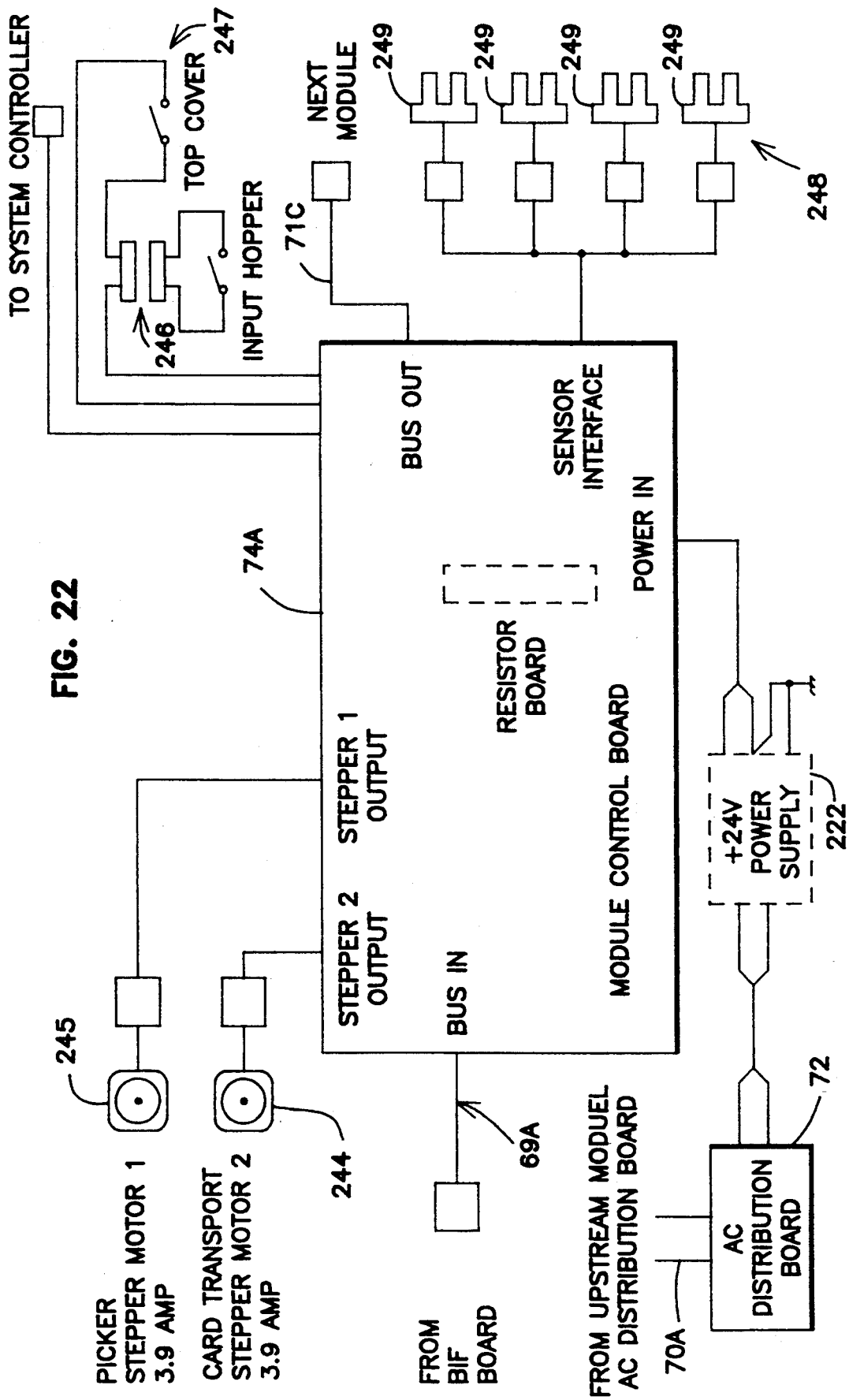
FIG. 22 is a schematic illustration of a module control circuit board present in one embodiment of an input hopper module.
Figure 23:
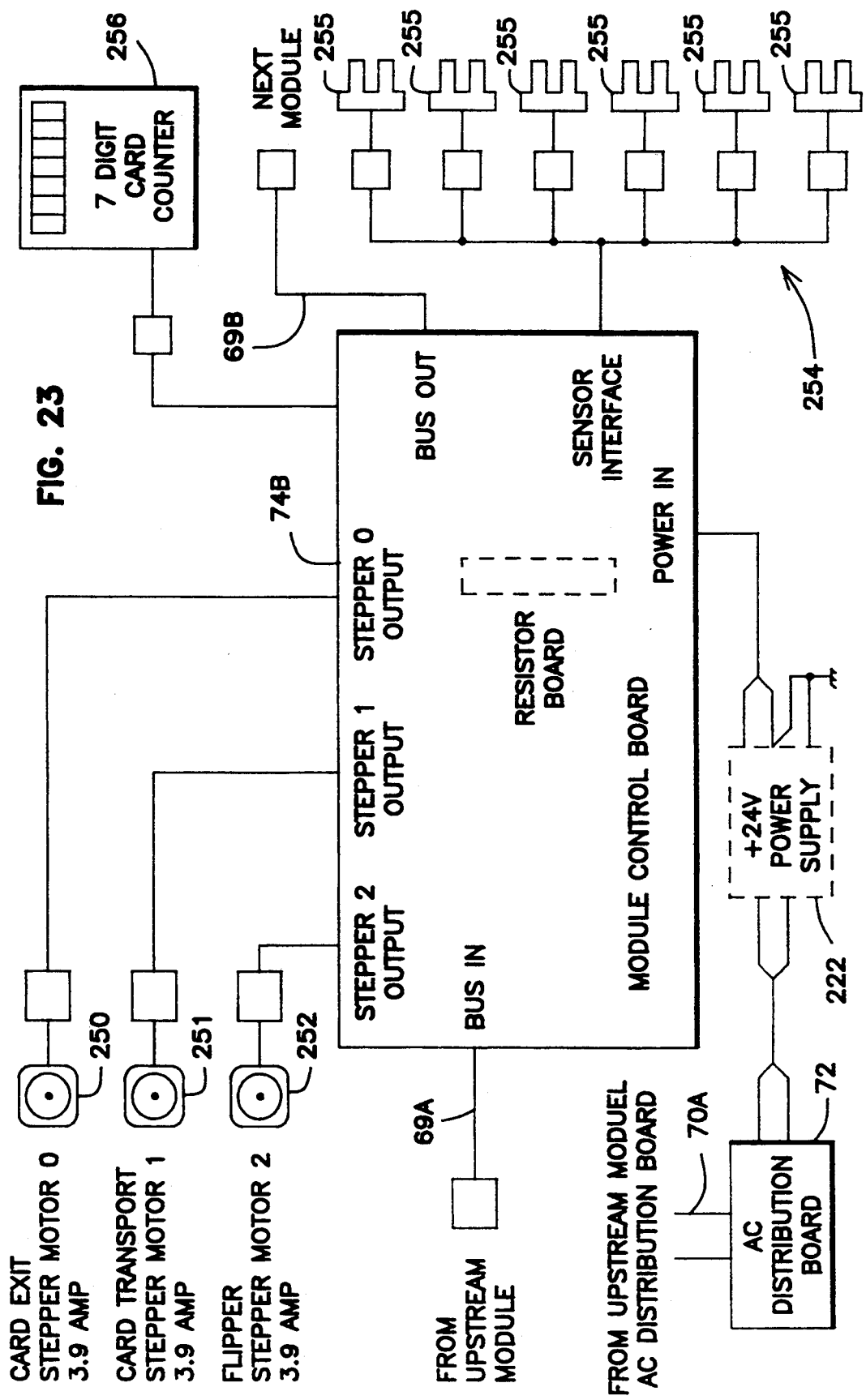
FIG. 23 is a schematic illustration of a module control circuit board present in one embodiment of an output hopper module.
Figure 24:
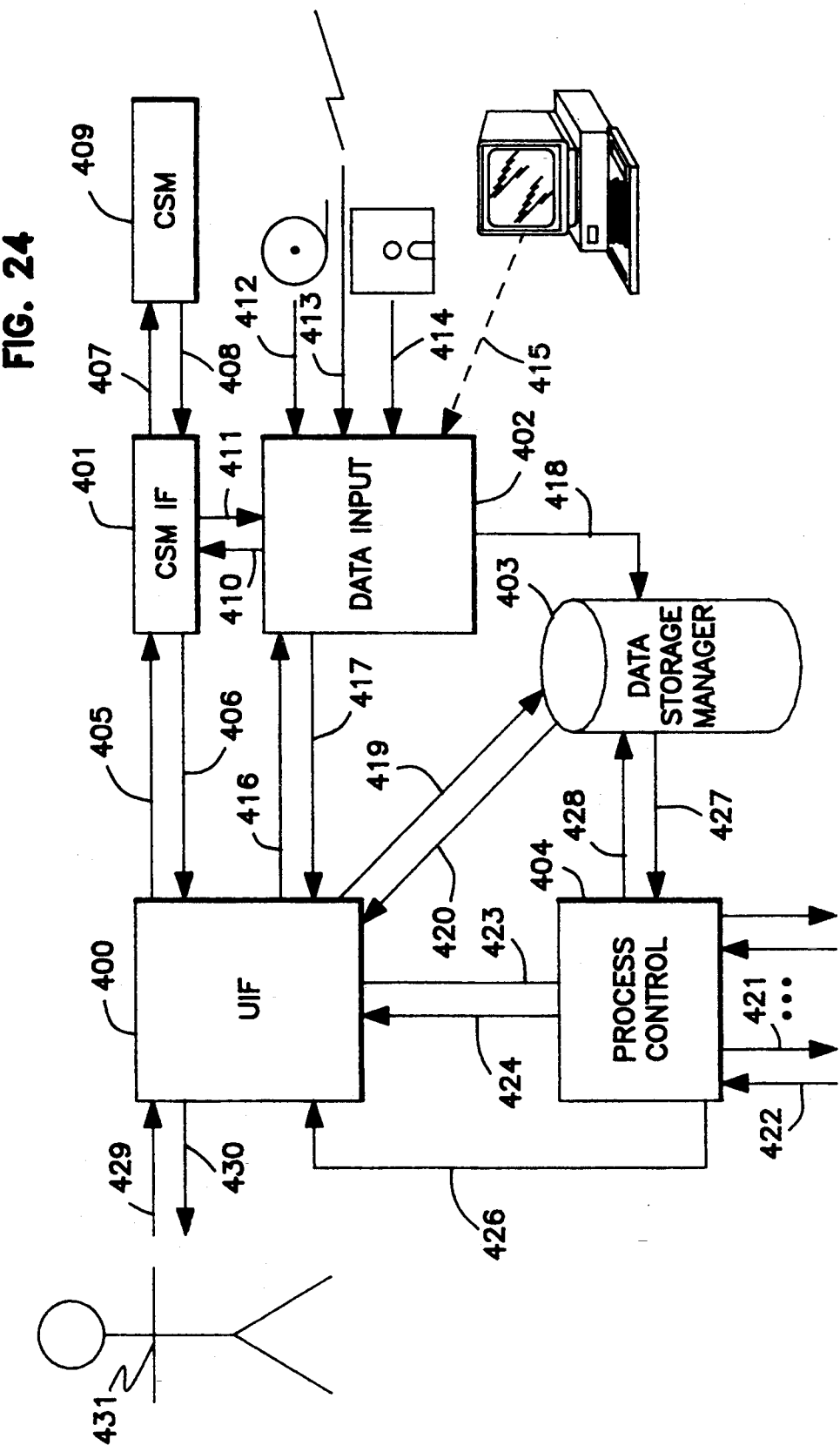
FIG. 24 is a block diagram showing the high-level architecture of the logic control system.
Figure 25:
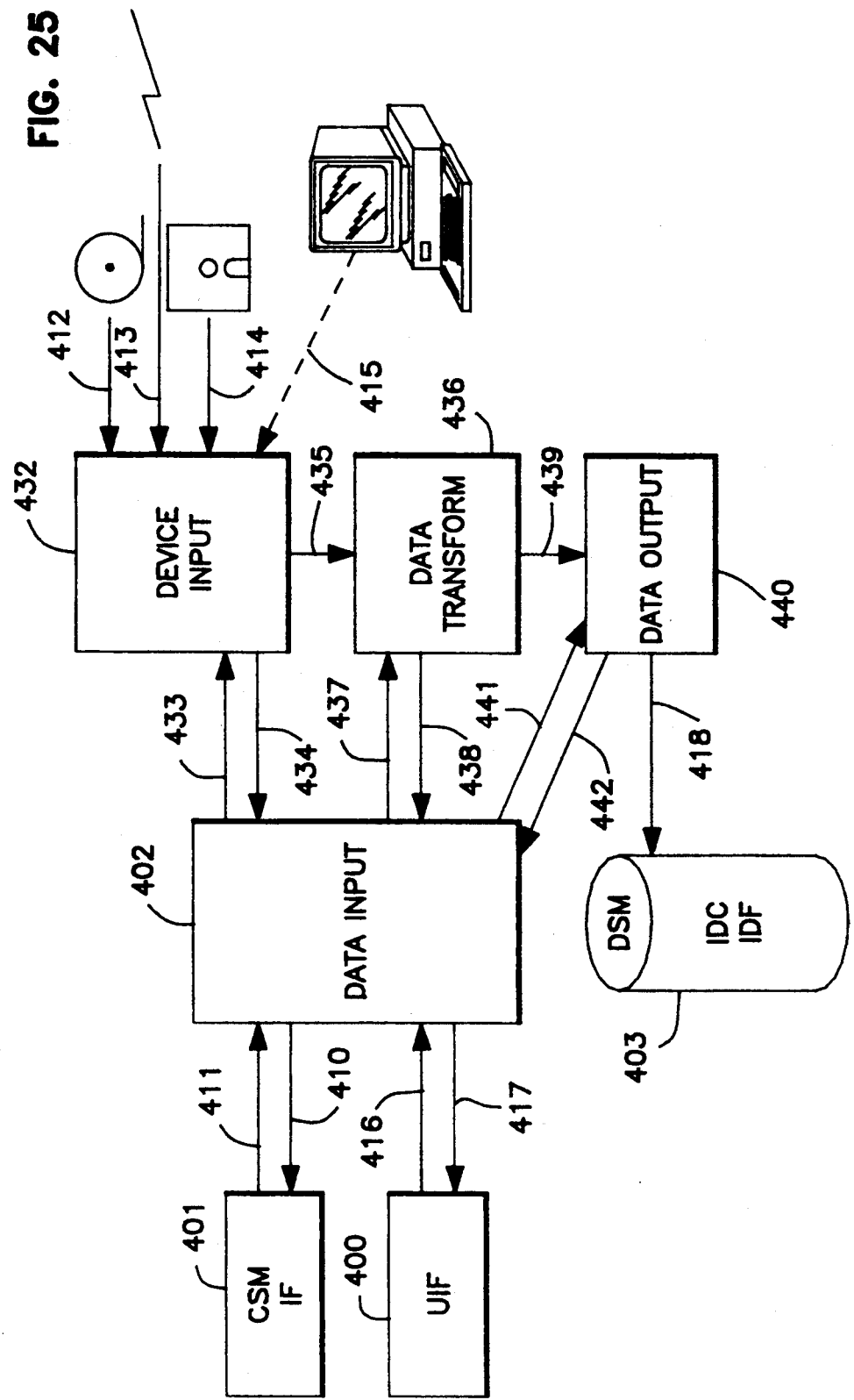
FIG. 25 is a block diagram showing the data input process.
Figure 26:
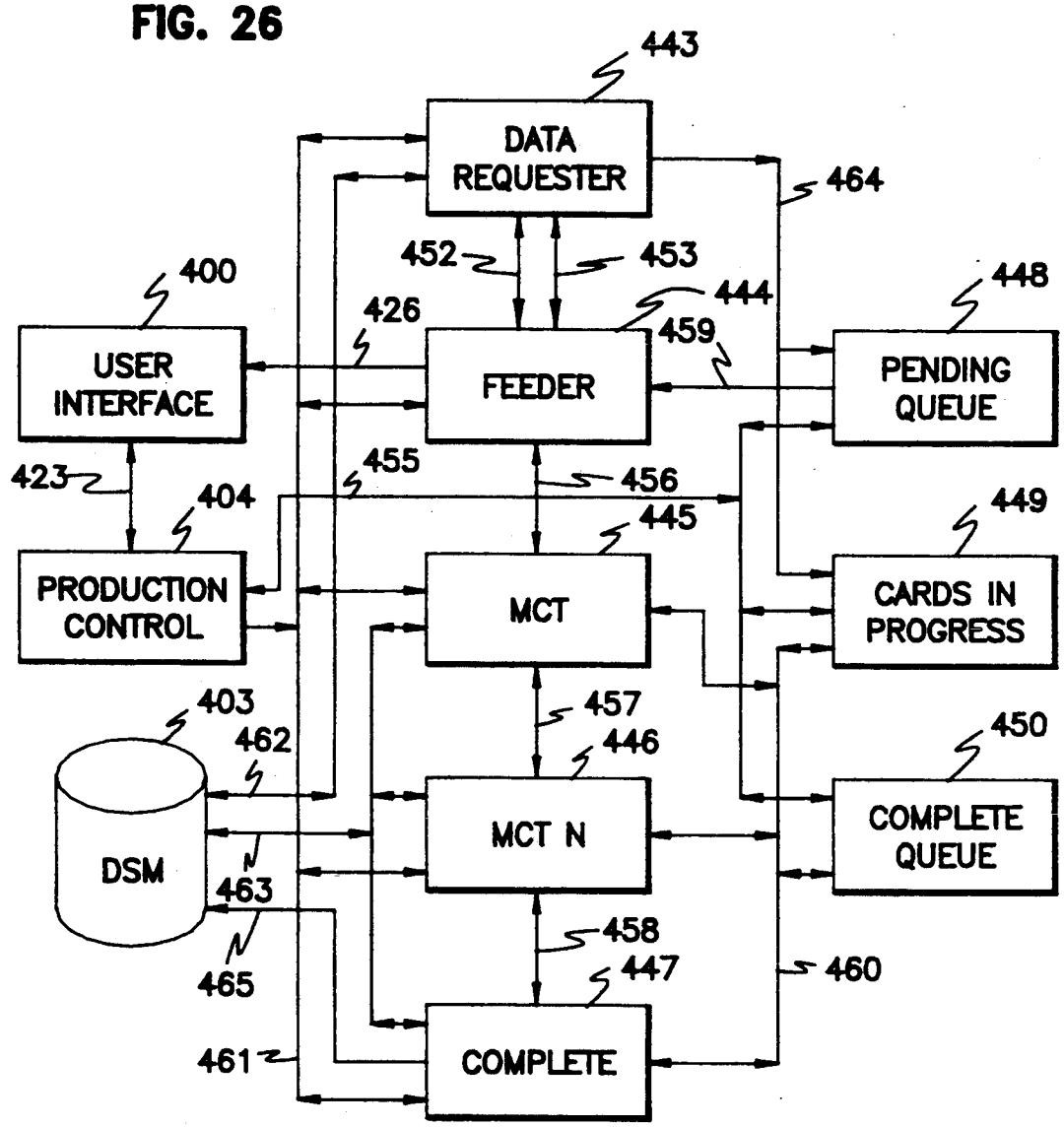
FIG. 26 is a block diagram showing the production control process.
Figure 27:
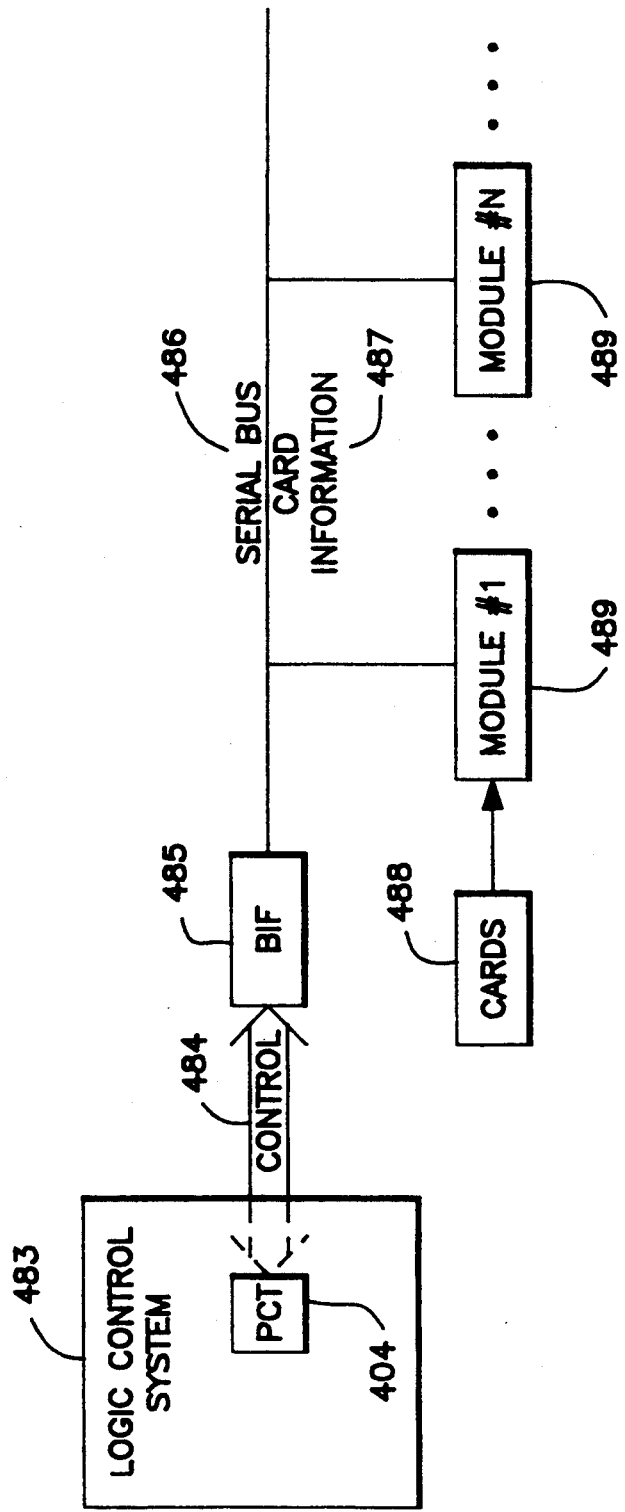
FIG. 27 is a block diagram showing the network topology of the logic control system.

Referring to FIGS. 16 and 17, a transverse bracket 203 is mounted between the second ends 201b of the takeup arms 201. As best seen in FIG. 17, a flange 203a is formed perpendicularly to the major surface of the transverse bracket 203. The flange 203a includes an extension 203b on either end of the flange 203. A mounting block 204 is pivotally mounted with respect to an inside surface of the transverse bracket flange 203a by a first pin 205, the mounting block 204 being located midway between the ends of the transverse bracket 203. Referring again to FIG. 16, a mounting plate 206 is pivotally mounted and centrally located on an outwardly-facing surface of the mounting block 204 by a second pin 207. Affixed to the mounting plate 206 is a cylindrical surface 208 which encompasses a major longitudinal portion of the transverse bracket 203 without contacting the transverse bracket 203. The mounting block 204, mounting plate 206, cylindrical surface 208, and first 205 and second 207 pins cooperate to allow pivotal displacement of the cylindrical surface 208 generally in two axes generally about a location midway along the transverse bracket 203. Looking at FIG. 17 these axes include a first axis extending perpendicular to the plane in which the figure lies and a second axis extending parallel to a longitudinal axis of the transverse bracket 203.

As seen in FIG. 16, a biasing mechanism 209, such as a spring, is attached to each end of the cylindrical surface 208 and to each corresponding transverse bracket flange extension 203b. The biasing mechanism 209 biases the cylindrical surface 208 into an "at rest" position in which the axis of the cylindrical surface 208 is generally parallel to the axis of the transverse bracket 203.

Referring to FIG. 15, a drive motor 210 is shown in communication with the shaft 202 for selectively driving the shaft 202 during form loading and causing rotational displacement of the takeup arms 201. It will be appreciated that this might be accomplished in any number of ways. After loading the forms past the cylindrical surface 208 of the paper takeup 200 and retaining the forms in the drive rollers 169 of the bursting mechanism 172, the drive motor 210 is disengaged from the takeup arms 201 such that the cylindrical surface 208 is biased into the forms so as to place the forms under tension.

The biasing arrangement of the preferred embodiment of the paper takeup 200 compensates for the weight of the takeup 200 and exerts a variable biasing force against the takeup arms 201 biasing the takeup arms 201 about their pivot point 202 upward and away from the printer 176 toward the front of the inserter module 50 so as to create a substantially constant paper tension on the paper throughout the range of movement of the takeup arms 201 during paper accumulation. The biasing arrangement is illustrated in FIG. 15 as including a cam plate 211 which is mounted to one end of the shaft 202 and is provided with a cam surface 211a along one edge. A cam roller 212 contacts the cam surface 211a of the cam plate 211, the cam roller 212 being mounted to a shaft 213 on a first end of a roller pressure arm 214. The second end of the roller pressure arm 214 is pivotally mounted to the inserter module chassis 180 at a location 214a. A first spring 215 balances or compensates for the weight of the takeup arms 201 so as to neutralize their weight. One end of the first spring 215 is mounted to suitable support structure of the inserter module chassis 180 at 215a, the other end of the first spring 215 is mounted to a projection 215b on the cam plate 211.

A second spring 216 is provided for placing the paper under constant tension. The spring 216 biases the roller 212 into rotational contact with the cam surface 211a at the cam plate 211. As shown in FIG. 15, the spring 216 is mounted at one end to the inserter module chassis 180 at 216a, while the other end of the second spring 216 is mounted to a point along the roller pressure arm 214 at 216b, causing the pressure arm 214 and roller 212 to engage the cam surface 211a.

The above described springs 215 and 216 play a very important role since the takeup arms 201 will cause very high paper tension when the paper path is nearly straight and will cause much lower tension in the paper as the takeup arms pivot upward. High tension in the paper can result in the paper being torn. Thus it is important to vary the force exerted by the takeup arms such that the paper tension remains substantially constant throughout the range of movement of the takeup arms 201. The cam surface 211a in combination with the springs accomplishes this. The configuration of the cam surface 211b might be determined in part by recursively drawing the cylindrical surface 208 of the paper takeup 200 in its various positions throughout its range of motion. In one embodiment, the paper forms are placed under a tension of roughly ½ pound.

It will be appreciated that the specific spring strength and location will vary depending on the configuration of the paper takeup 200. In the embodiment shown the L-shaped takeup arms 201 are roughly 8 ¼ to 8 ½ inches long and have a base roughly 4 ½ inches long. The pivot arm 214 has a length of roughly 5 ⅜ inches. The paper takeup has an overall weight of roughly one pound. The center of gravity of the paper takeup is roughly five (5) inches below the shaft 202 and one (1) inch in back of a vertical plane parallel to the shaft 202.

What is claimed is:

1. An inserter module attaching processed cards to associated card carrier forms having predetermined cardholder information printed thereon, including:
    a chassis;
    printer means for printing predetermined cardholder information on serially connected card carrier forms;
    takeup means for maintaining proper takeup of said serially connected carrier forms as they exit said printer, the takeup means including a variable force biasing means having a spring and cam arrangement for placing the forms under substantially constant tension during the takeup process;
    bursting means for separating said serially connected carrier forms after printing; and
    inserter means for attaching said processed cards to associated printed carrier forms.

2. An inserter module in accordance with claim 1, further including mounting means for interchangeably mounting said printer so as to allow interchangeable use of different printers.

3. An inserter module in accordance with claim 2, further including printer guide means for guiding said serially connected card carrier forms as they enter and exit said printer, said form guide means being mounted above said printer.

4. An inserter module in accordance with claim 1, wherein said takeup means provides for accumulation of at least one form between the printer means and the bursting means.

5. An inserter module in accordance with claim 1, further comprising a takeup arm, and wherein the variable force biasing means applies a variable force on the takeup arm.

6. An inserter module in accordance with claim 1, wherein printing on the forms occurs while forms are being burst and inserted.

7. An inserter module in accordance with claim 1, wherein said takeup means includes a takeup arm wherein the spring and cam arrangement act on the takeup arm to affect tension caused by the takeup arm on the card carrier forms.

8. An inserter module attaching processed cards to associated card carrier forms having predetermined cardholder information printed thereon, including:
    a chassis;
    printer means for printing predetermined cardholder information on serially connected card carrier forms;
    takeup means for maintaining proper takeup of said serially connected carrier forms as they exit said printer;
    bursting means for separating said serially connected carrier forms after printing;
    inserter means for attaching said processed cards to associated printed carrier forms; and
    mounting means for interchangeably mounting said printer so as to allow interchangeable use of different printers, wherein the mounting means includes a printer carriage mounted on guide means for reciprocal movement of said carriage into and out of said chassis, said carriage including a horizontal support surface.

9. An inserter module attaching processed cards to associated card carrier forms having predetermined cardholder information printer thereon, including:
    a chassis;
    printer means for printing predetermined cardholder information on serially connected card carrier forms;
    takeup means for maintaining proper takeup of said serially connected carrier forms as they exit said printer;
    bursting means for separating said serially connected carrier forms after printing;
    inserter means for attaching said processed cards to associated printed carrier forms;
    mounting means for interchangeably mounting said printer so as to allow interchangeable use of different printers; and
    printer guide means for guiding said serially connected card carrier forms as they enter and exit said printer, said form guide means being mounted above said printer, wherein said printer guide means is removably supported on a shaft of a printer platen so as to allow removal from the printer.

10. An inserter module attaching processed cards to associated card carrier forms having predetermined cardholder information printed thereon, including:

a chassis;

printer means for printing predetermined cardholder information on serially connected card carrier forms;

takeup means for maintaining proper takeup of said serially connected carrier forms as they exit said printer, said takeup means includes pivotal means for maintaining substantially uniform tension across a width of the form so as to compensate for any skewing of the forms due to misalignment of the printer means and the inserter means;

bursting means for separating said serially connected carrier forms after printing; and inserter means for attaching said processed cards to associated printed carrier forms.

11. An inserter module attaching processed cards to associated card carrier forms having predetermined cardholder information printed thereon, including:

a chassis;

printer means for printing predetermined cardholder information on serially connected card carrier forms;

takeup means for maintaining proper takeup of said serially connected carrier forms as they exit said printer, said takeup means includes an elongated arcuate portion engaging a form across the width of the form, the elongated arcuate portion being pivotal about two axes;

bursting means for separating said serially connected carrier forms after printing; and inserter means for attaching said processed cards to associated printed carrier forms.

12. An inserter module attaching processed cards to associated card carrier forms having predetermined cardholder information printed thereon, including:

a chassis;

printer means for printing predetermined cardholder information on serially connected card carrier forms;

takeup means for maintaining proper takeup of said serially connected carrier forms as they exit said printer, said takeup means includes variable biasing means for placing the forms under substantially constant tension during the takeup process, wherein the variable biasing means has a spring and cam arrangement and the cam has an arcuate surface;

bursting means for separating said serially connected carrier forms after printing; and inserter means for attaching said processed cards to associated printed carrier forms.

* * * * *